US012485078B2

(12) United States Patent
Hug et al.

(10) Patent No.: US 12,485,078 B2
(45) Date of Patent: Dec. 2, 2025

(54) PERSONAL DENTAL CARE PRODUCT FOR CARIES TREATMENT

(71) Applicant: Credentis AG, Windisch (CH)

(72) Inventors: Michael Hug, Zofingen (CH); Dominikus Amadeus Lysek, Windisch (CH)

(73) Assignee: Credentis AG, Windisch (CH)

( * ) Notice: Subject to any disclaimer, the term of this patent is extended or adjusted under 35 U.S.C. 154(b) by 161 days.

(21) Appl. No.: 16/302,928

(22) PCT Filed: May 24, 2017

(86) PCT No.: PCT/EP2017/062589
§ 371 (c)(1),
(2) Date: Nov. 19, 2018

(87) PCT Pub. No.: WO2017/202940
PCT Pub. Date: Nov. 30, 2017

(65) Prior Publication Data
US 2019/0142724 A1 May 16, 2019

(30) Foreign Application Priority Data
May 24, 2016 (EP) .................................. 16171015

(51) Int. Cl.
| | | |
|---|---|---|
| *A61K 8/64* | (2006.01) | |
| *A23G 3/44* | (2006.01) | |
| *A23G 4/14* | (2006.01) | |
| *A23L 33/18* | (2016.01) | |
| *A61K 8/02* | (2006.01) | |
| *A61K 8/11* | (2006.01) | |
| *A61K 8/19* | (2006.01) | |
| *A61K 8/25* | (2006.01) | |
| *A61K 8/34* | (2006.01) | |
| *A61K 8/44* | (2006.01) | |
| *A61K 8/46* | (2006.01) | |
| *A61K 8/55* | (2006.01) | |
| *A61K 8/73* | (2006.01) | |
| *A61K 8/92* | (2006.01) | |
| *A61K 8/9789* | (2017.01) | |
| *A61K 8/98* | (2006.01) | |
| *A61Q 11/00* | (2006.01) | |
| *A61K 38/00* | (2006.01) | |

(52) U.S. Cl.
CPC .................. *A61K 8/64* (2013.01); *A23G 3/44* (2013.01); *A23G 4/14* (2013.01); *A23L 33/18* (2016.08); *A61K 8/0204* (2013.01); *A61K 8/11* (2013.01); *A61K 8/19* (2013.01); *A61K 8/25* (2013.01); *A61K 8/345* (2013.01); *A61K 8/442* (2013.01); *A61K 8/463* (2013.01); *A61K 8/553* (2013.01); *A61K 8/73* (2013.01); *A61K 8/922* (2013.01); *A61K 8/9789* (2017.08); *A61K 8/987* (2013.01); *A61Q 11/00* (2013.01); *A23V 2002/00* (2013.01); *A61K 38/00* (2013.01)

(58) Field of Classification Search
CPC . A61K 8/64; A61K 8/11; A61K 38/00; A23G 3/44; A23G 4/14; A61Q 11/00; A23V 2002/00; A61P 1/02
See application file for complete search history.

(56) References Cited

U.S. PATENT DOCUMENTS

| | | | | |
|---|---|---|---|---|
| 4,345,892 | A | * | 8/1982 | Schulte ............... B29C 45/2735 425/548 |
| 6,548,630 | B1 | | 4/2003 | Zhang et al. |
| 10,047,120 | B2 | | 8/2018 | Hug et al. |
| 2007/0148286 | A1 | * | 6/2007 | Jani ........................ A23G 4/205 426/5 |
| 2008/0199431 | A1 | | 8/2008 | Capito et al. |

FOREIGN PATENT DOCUMENTS

| | | |
|---|---|---|
| EP | 2327428 A2 | 6/2011 |
| EP | 2698162 A1 | 2/2014 |
| EP | 2853256 A1 | 4/2015 |
| EP | 2856256 A1 | 4/2015 |
| WO | 2004007532 A2 | 1/2004 |
| WO | 2004069170 A2 | 8/2004 |
| WO | 2006047315 A2 | 5/2006 |
| WO | 2006073889 A2 | 7/2006 |

(Continued)

OTHER PUBLICATIONS

Amaechi, BT, Remineralization Therapies for Initial Caries Lesions, Curr Oral Health Rep (2015) 2:95-101 (Year: 2015).*
Baliga, J Indian Soc Periodontol. Jul.-Aug. 2013; 17(4): 461-465, 11 pagesBaliga, J Indian Soc Periodontol. Jul.-Aug. 2013; 17(4): 461-465, 11 pages (Year: 2013).*
Ansel, Pharmaceutical Dosage Forms and Drug Delivery Systems: New Drug Development and Approval Process, 1999, 7 pages (Year: 1999).*
Abolfazl Aslani et al., Design, formulation and evaluation of caffeine chewing gum, Adv Biomed Res., 2:72, 2013.

(Continued)

*Primary Examiner* — Jeanette M Lieb
(74) *Attorney, Agent, or Firm* — Pabst Patent Group LLP

(57) ABSTRACT

The present invention provides new dental care products comprising self-assembling peptides that are capable of undergoing self-assembly at a certain pH for use in dental care, e.g. preventing and/or treating a tooth lesion such as a caries lesion, remineralising a tooth surface or increasing smoothness or shine, or for increasing hardness of a tooth surface. The present invention provides dental care products such as chewing gum, toffees or toothpaste, in which the peptides are present in monomeric form for a prolonged period after application into the oral cavity, thereby enabling non-targeted treatment of a plurality of teeth, independent of the diagnosis of an active lesion. Products of the invention are useful for animals and humans.

16 Claims, 6 Drawing Sheets
Specification includes a Sequence Listing.

(56) References Cited

FOREIGN PATENT DOCUMENTS

| WO | 2006127559 A2 | 11/2006 |
|---|---|---|
| WO | 2007143989 A1 | 12/2007 |
| WO | 2008113030 A2 | 9/2008 |
| WO | 2007000979 A1 | 1/2009 |
| WO | 2009026729 A1 | 3/2009 |
| WO | 2009100276 A2 | 8/2009 |
| WO | 2010041636 A1 | 3/2012 |
| WO | 2010103887 A1 | 9/2012 |
| WO | 2013050432 A2 | 4/2013 |
| WO | 2014027012 A1 | 2/2014 |
| WO | 2014152952 A1 | 9/2014 |
| WO | 2015044268 A1 | 4/2015 |
| WO | 2017202943 A1 | 11/2017 |

OTHER PUBLICATIONS

Aggeli et al., pH as a Trigger of Peptide a-Sheet Self-Assembly and Reversible Switching between Nematic and Isotropic Phases, J. Am. Chem. Soc. 125, 9619-9628, 2003.
Andersson et al., Large-Scale Synthesis of Peptides, Biopolymers 55:227-250, 2000.
Baliga et al., Salivary pH: A diagnostic biomarker, J Indian Soc Periodontal. 17:461-465, 2013.
Chaudhary et al., Directly compressible medicated chewing gum formulation for quick relief from common cold, Int J Pharm Investig; 2(3); 123-133, 2012.
Chuenarron et al., Effect of Indentation Load and Time on Knoop and Vickers Microhardness Tests for Enamel and Dentin, Materials Research 12(4), 473-476, 2009.
Hiraishi, N. et al, Two-Year Clinical Performance of Class V Resin-Modified Glass-Ionomer and Resin Composite Restorations, Operative Dentistry 28(5):598-604, 2003.
Lo et al., Comparing two quantitative methods for studying remineralization of artificial caries, (J Dent. 38( 4):352-359, 2010.
Kind et al., Biomimetic Remineralization of Carious Lesions by Self-Assembling Peptide, Journal of Dental Research 1-8, 2017.
Kirkham et al., Self-assembling Peptide Scaffolds Promote Enamel Remineralization, Dent. Res. 86(5), 426-430, 2007.
Kyle et al., Recombinant self-assembling peptides as biomaterials for tissue engineering, Biomaterials 31, 9395-9405, 2010.
Kyle et al., Production of self-assembling biomaterials for tissue engineering, Trends in Biotechnol. 27 (7), 423-433, 2009.
Merrifield, Solid Phase Peptide Synthesis. I. The Synthesis of a Tetrapeptide, J. Am. Chem. Soc., 85, 2149-2154, 1964.
Nedovic et al, An overview of encapsulation technologies for food applicationsProcedia Food Science 1, 1806-1815, 2011.
Zumbe et al., Polyols in confectionery: the route to sugar-free, reduced sugar and reduced calorie confectionery, British Journal of Nutrition 85, Suppl. 1, S3 I-S45, 2001.
Brunton, Treatment of early caries lesions using biomimetic self-assembling peptides—a clinical safety trial, British Dental Journal, p. 1-6, 2013.
Schlee et al., Klinischer Effekt biomimetischer Mineralisation bei Approximalkaries, Stomatologie 4, p. 1-7, 2014.
International Search Report issued by the European Patent Office for application PCT/EP2017/062589, dated Jul. 21, 2017.
Schlee et al., Klinischer Effekt biomimetischer Mineralisation bei Approximalkaries, Stromatologie, vol. 111, pp. 175-181, 2014.
Brunton et al., Treatment of early caries lesions using biomimetic self-assembling peptides—a clinical safety trial, British Dental Journal, vol. 215, No. 4, E6 p. 1-3, 2013.

\* cited by examiner

B

B

C

D

B

C

B

B artificial subsurface lesion

PERSONAL DENTAL CARE PRODUCT FOR CARIES TREATMENT

The present invention provides new dental care products comprising self-assembling peptides that are capable of undergoing self-assembly at a certain pH for use in dental care, e.g. preventing and/or treating a tooth lesion such as a caries lesion, remineralising a tooth surface or increasing smoothness or shine, or for increasing hardness of a tooth surface. The present invention provides dental care products such as chewing gum, toffees or toothpaste, in which the peptides are present in monomeric form for a prolonged period after application into the oral cavity, thereby enabling non-targeted treatment of a plurality of teeth, independent of the diagnosis of an active (i.e., not previously successfully treated) lesion. Products of the invention are useful for animals and humans.

To date, tooth remineralisation is achieved mainly by the delivery of calcium and phosphate ions into tooth lesions or cavities. The calcium and phosphate ions are usually included in tooth pastes which also contain e.g. abrasives, fluorides, surfactants and other remineralisation agents. The calcium and phosphate ions may be used in various crystalline forms, e.g. as hydroxyapatite-based materials, or as amorphous calcium phosphate, such as in some casein phosphopeptide-based materials. For example, WO 2013/050432 describes such remineralizing agents and options for contacting the gum with these agents. WO 2009/100276 teaches a dental floss associated with a basic amino acid in free or salt form, e.g., for promoting remineralization.

More recently, an alternative approach to tooth remineralisation has been described, which is based on short rationally designed self-assembling peptides. WO 2004/007532 discloses peptides that are capable of forming three-dimensional scaffolds, thereby promoting nucleation of de-novo calcium phosphate. These artificial peptides assemble to form beta-sheet, tape-like assemblies. The peptide assemblies can switch from a fluid to a nematic, stiffer gel state in response to chemical or physical triggers. The peptides were designed to form assemblies in response to certain pH, ionic strength and/or temperature conditions in the following hierarchical order: tapes, ribbons, fibrils and fibres. Aggeli et al. (2003, J. Am. Chem. Soc. 125, 9619-9628) analyses pH as a trigger of peptide beta-sheet self-assembly.

Several other self-assembling peptides have been described in the prior art. For example, WO 2010/041636 A1 describes a bioadsorbable peptide tissue occluding agent containing an artificial peptide having 8-200 amino acid residues with the hydrophilic amino acids and hydrophopbic amino acids alternately bonded, which self-assembles into a beta-structure at physiological pH. Self-assembling peptides with alternating hydrophobic and hydrophilic residues or stretches which interact with the extracellular matrix are also disclosed in WO 2008/113030 A2. WO 2010/103887 A1 discloses self-assembling peptides, which comprise basic, hydrophobic and acidic amino acids of a specific primary sequence and peptide gels thereof which have high strength.

Another application, WO 2007/000979 A1, describes self-assembling peptides with polar and non-polar amino acids. The peptides are capable of forming a beta-sheet structure in which the non-polar amino acid residues are arranged on one side of the structure in the assembled form. Amphiphilic self-assembling peptides for use as stable macroscopic membranes, which are used in biomaterial applications, such as slow-diffusion drug delivery, are described in U.S. Pat. No. 6,548,630.

EP 2 327 428 A2 refers to a pharmaceutical composition comprising self-assembling peptide nanofibers, which are complementary to each other, and at least one cell for repairing damaged tissue, such as tissue after a myocardial infarction.

EP 2 853 256 A1 and WO 2015/044268 A1 teach that self-assembling peptide hydrogels further comprising mineral particles of specific sizes and fluorophores are useful for tooth whitening.

The use of self-assembling peptides for the delivery of bioactive agents has been described, for example in US 2008/199431 A1 and in WO 2009/026729 A1. WO 2006/073889 A2 relates to a composition in which human PDGF is bound directly to peptides which assemble into a gel that slowly releases PDGF in vivo. WO 2006/047315 A2 proposes the attachment of therapeutic agents to self-assembling peptides using biotin/streptavidin linkages.

Kirkham et al. and Kind et al. relate to self-assembling peptide scaffolds promoting enamel remineralisation (Kirkham et al. 2007, Dent. Res. 86(5), 426-430; Kind et al. 2017, Journal of Dental Research 1-8, doi10.1177/0022034517698419).

To effectively treat tooth lesions, in particular, sub-surface lesions (i.e., an early caries lesion or white spot), the self-assembling peptide needs to be in a monomeric form outside the tooth lesion to enable diffusion into the lesion, and it needs to switch into an assembled form once inside the tooth lesion. If the peptide assembles outside the lesion, it cannot facilitate remineralisation within the lesion, having a low pH and high ionic strength, as the formed three-dimensional structures are too large to diffuse through the pores. Therefore, assembly of the peptide should be prevented until it reaches its site of action.

WO 2014/027012 A1 and EP 2 698 162 A1 provide lyophilized solutions comprising self-assembling peptides for targeted treatment of tooth lesions. Since the solution comprising the peptides has to be applied directly onto the surface of the early caries lesion, the application is restricted to professional users, e.g. dentists. Further, pre-conditioning of the tooth to be treated is very complex, including professional cleaning of the tooth in order to remove plaque, food debris and stains as well as treatment with sodium hypochlorite and phosphoric acid, subsequent rinsing with water and drying the tooth surface. Brunton et al., 2013, Br. Dent. J. 215(4): E6, doi:10.1038/sj.bdj.2013.741) confirms that, before treatment, the lesion was cleaned with a prophylaxis paste, treated with etch solution for 30 seconds to open up the pores of the subsurface lesion and subsequently washed and dried. Lyophilised self-assembling peptide in monomeric form was rehydrated with sterile water and a single drop of the resulting solution immediately applied directly to the lesion surface. Moisture control was ensured until the P11-4 solution was no longer visible (approximately two minutes). The subjects were asked not to brush their teeth in the treated quadrant until 4 days after treatment. Schlee et al., 2014, Stomatologie 111:175-181 confirms the need for pre-treatment and moisture control.

Due to the complicated treatment, there is a substantial cost for the patient and/or the health system involved. Furthermore, there are subjects which, for psychological reasons, avoid or delay visits to the dental practitioner until caries lesions have so widely progressed that the dentist may prefer drilling and filling over the treatment approach using self-assembling peptides.

Accordingly, in light of the state of the art, the inventors solved the problem of providing a dental care product capable of treating caries lesions that is easy to administer, preferably for over the counter sale or retail, and which can be applied by the patient or consumer in order to treat or prevent caries and/or remineralise tooth surfaces.

This problem is solved by the present invention, in particular, by the claimed subject-matter.

In a first aspect, the present invention provides a dental care product comprising
(i) self-assembling peptides that are capable of undergoing self-assembly at a pH below 7.5, wherein the self-assembling peptides are present in the dental care product in monomeric form, and
(ii) a pharmaceutically acceptable basis,
for use in treating or preventing a tooth lesion and/or in remineralising a tooth surface,
wherein the dental care product is applied to a plurality of teeth of a subject independent of diagnosis of caries, preferably, active caries,
and wherein, after application, the self-assembling peptides are present in monomeric state for at least 1 minute.

In particular, dental care products of the present invention may be used in treating a tooth lesion, preferably a caries lesion, e.g. a subsurface caries or a cavitated caries lesion. Alternatively or additionally, said dental care products may be used in remineralising a tooth surface, e.g. a dental cavity, a white spot lesion or exposed dentin. Preferably, the products of the invention may be used to prevent progression of early caries lesions to cavitated caries lesions.

Bacteria, in particular from the genera *Streptococcus*, *Lactobacillus* and *Actinomyces*, produce acid by fermentation of carbohydrates that originate from food. The acid formed upon fermentation results in a demineralization of the hard tooth tissues, i.e. the enamel, dentin and cementum. Tooth lesions and cavities may also be the result of a physical trauma. If left untreated, a caries lesion or cavity may lead to an infection of the pulp chamber, which contains blood vessels and nerves, which may ultimately result in tooth loss.

Generally, the lesion or cavity may be present on any tooth, e.g. on the incisors (Dentes incisivi), the canine teeth (Dentes canini), the premolar teeth (Dentes praemolares) and/or the molar teeth (Dentes molares). Similarly, the lesion or cavity may affect any of the surfaces of a tooth, i.e. on labial, mesial, buccal, palatal, proximal, occlusal and/or distal surfaces. In the context of the invention, unless explicitly mentioned or clear from the context, "a" is not limited to the singular, but can also mean "one or more". For example, reference to "a lesion" includes reference to more than one lesion, in particular, all lesions of the subject.

Products of the invention are intended for use in routine dental care independent of prior diagnosis of caries (or, preferably, of active caries), preferably, without prior diagnosis of caries (or, preferably, of active caries), more preferably, also without diagnosis of demineralisation or tooth erosion. Diagnosis of active caries, e.g., of white spots which are considered the first stage of caries or of more progressed stages, is typically carried out by a dental professional. The invention advantageously avoids the need for diagnosis and treatment by professional dental practitioners and enables subjects to effectively treat and prevent tooth lesions on their own. Preferably, the subjects apply the dental care product regularly, so that beginning caries, e.g., white spots or demineralisations can be remineralised by the product of the invention.

As used herein, "prior diagnosis of caries" or "prior diagnosis of active caries" refers to a caries lesion which has been diagnosed by a professional, e.g. a dentist, but which has not yet been treated. In contrast, prior diagnosis of (active) caries does not refer to a caries lesion which has been successfully treated before the application of the product of the invention.

It is known in the art that there is no need for treatment of arrested caries. Arrested caries is, in contrast, considered to be more resistant to recurrence of caries than healthy enamel or dentin. Thus, the skilled person would know that any caries lesion conventionally treated in the art is an active caries lesion. In any case, presence of arrested caries lesions does not preclude application of the dental care product of the invention. The dental care product can also contribute to further remineralisation of arrested caries lesions. Accordingly, it is evident to the skilled person that the products of the invention can also be used independent of the diagnosis or without the prior diagnosis of arrested caries lesions.

Previous treatment relates to targeted treatment typically administered by a dental professional, which is capable of at least arresting progression of caries, i.e., it encompasses targeted treatment with self-assembling peptides as well as a drilling and filling approach. Successful treatment of an active caries lesion leads to an arrested caries lesion.

Upon application to the oral cavity, the peptides remain in a monomeric, non-assembled state for a certain period to ensure distribution of the product to a plurality of teeth and to allow for entry into subsurface lesions, if any are present. In particular, the dental care products of the invention can be used to fill tooth lesions and/or cavities with a network of interconnected peptides that promote the remineralisation of the lesion by deposition of calcium and phosphate ions, which are present, e.g. in the saliva. As used herein, a caries "lesion" is a subsurface lesion or a subsurface microlesion in the tooth or the tooth surface that is normally caused by acid formation of the bacteria present in the oral biofilm (ICDAS-II scale 1-4). As used herein, a tooth "cavity" is a hole in the surface of a tooth (ICDAS-II scale ≥5).

The present invention is inter alia based on the insight, that, if suitable galenic forms are used which are capable of keeping self-assembling peptides in their monomeric state over a prolonged period by providing an environment which prevents the peptides from assembling, the products do not need to be applied to teeth lesions in a targeted manner. They are thus suitable for application by the patient or consumer without professional assistance, e.g. by a dentist. Furthermore, these products can be used independent of diagnosis of caries, preferably, active caries.

The self-assembling peptides may be present in a monomeric state for at least 1 minute, preferably, at least 2 minutes, more preferably at least 3 minutes after application in the oral cavity. Preferably, the self-assembling peptides are present in a monomeric state for the typical time span for which the dental care product is normally applied to the teeth, e.g., for 2-3 minutes if the product is applied with a toothbrush, e.g., if the product is a toothpaste.

As used herein, "subject" refers to any subject having teeth, e.g., a mammal such as a human, a dog, a feline such as a cat, a rodent such as a mouse, rat, hamster, guinea pig, a cow, a horse, a camel, a sheep, a goat or another pet, farm or zoo animal having teeth.

The invention also provides a method for treating a tooth lesion, preferably a caries lesion, and/or for remineralising a tooth surface, comprising applying a dental care product to a plurality of teeth of a subject independent of diagnosis of caries, preferably, active caries, wherein the dental care product comprises
(i) self-assembling peptides that are capable of undergoing self-assembly at a pH below 7.5, wherein the self-assembling peptides are present in the dental care product in monomeric form, and (ii) a pharmaceutically acceptable basis, and wherein, after application, the self-assembling peptides are present in monomeric state for at least 1 minute.

In a further aspect, the invention provides a method for remineralising a tooth surface or increasing hardness, e.g. microhardness of a tooth surface, comprising applying said dental care product to a plurality of teeth of a subject independent of diagnosis of caries, preferably, active caries or demineralisation or tooth erosion.

Self-assembling peptides that are capable of undergoing self-assembly at a pH below 7.5 may also be used for preparation of a dental care product for treatment of a tooth lesion, preferably a caries lesion and/or for remineralising a tooth surface and/or for increasing hardness of teeth.

In another aspect, the invention also relates to a non-therapeutic method for treating teeth, comprising applying a product of the present invention to a plurality of teeth in a subject. Specifically, the invention also provides a non-therapeutic, e.g. a cosmetic, method for treating teeth, e.g. for increasing hardness of tooth surfaces comprising applying a dental care product of the invention to a plurality of teeth. Dental care products of the present invention may also be applied to increase smoothness of tooth surfaces and/or provide increased shine of teeth.

Self-assembling peptides used in the products of the invention undergo self-assembly in response to a certain pH and ionic strength. In particular, the self-assembling peptides for use according to the invention are selected such that they undergo self-assembly as soon as the pH of their environment drops below a certain pH, e.g. below pH 7.5. The pH at which the self-assembling peptides of the invention start to undergo self-assembly is below 7.5, preferably below 7.2, more preferably below 7.0. For example, the pH at which the self-assembling peptides P11-4 (SEQ ID NO:1) and terminally modified P11-4 (SEQ ID NO:2) start to undergo self-assembly is about 7.5. This means that the self-assembling peptides start to self-assemble to a significant extent when the pH drops below 7.5.

As used herein, the pH at which the self-assembling peptide starts to undergo self-assembly refers to the pH below which a significant extent of self-assembly of the peptides in solution is observed, which means that at least about 25%, about 30%, about 35%, about 40%, about 45%, about 50%, about 55%, about 60%, about 65%, about 70%, about 75%, about 80%, about 85%, about 90%, about 95%, about 99% or even about 100% of the peptides found in the dental care product are assembled. In a preferred embodiment, at least about 25% of the peptides found in the dental care product are assembled below the pH at which the peptide starts to undergo self-assembly.

Preferably, at the pH which initiates self-assembly, e.g. about pH 7.5 for P11-4 and modified P11-4, only about 20% or less, preferably only about 15% or less, more preferably 10% or less, and even more preferably 5% or less of the peptides are in a multimeric state.

In contrast, below the pH which initiates self-assembly, e.g. below pH 7.5 for P11-4 (SEQ ID NO:1) and modified P11-4 (SEQ ID NO:2), a significant extent of self-assembly of the peptides in solution is observed, which means that at least about 25%, about 30%, about 35%, about 40%, about 45%, about 50%, about 55%, about 60%, about 65%, about 70%, about 75%, about 80%, about 85%, about 90%, about 95%, about 99% or even about 100% of the peptides found in the solution are assembled, i.e. multimeric.

Preferably, the ionic strength at which the peptides undergo self-assembly is physiologic ionic strength.

As used herein, "self-assembly" of the peptides refers to the spontaneous and reversible organization of peptides with other peptides of their own kind (or peptides having a similar structure) into multimeric assemblies by non-covalent interactions. Non-covalent interactions that are responsible for forming the multimeric assemblies include van-der-Waals, pi-stacking, hydrogen bonds, polar and ionic interactions between the amino acid backbones and/or the amino acid side chains of the peptides.

The self-assembling peptides used in the products of the invention preferably assemble into beta-pleated sheets. In the beta-pleated sheet, the sheet-like structure is created by a series of hydrogen bonds between residues in different polypeptide chains or between residues in different sections of a folded polypeptide. Typically, adjacent polypeptide chains in beta-pleated sheets are anti-parallel, which means that they run in opposite directions. However, the adjacent chains may also run parallel. If several polypeptide chains participate in the sheet formation, the sheet is a rigid wall-like structure. Multiple pleated sheets provide the requisite toughness and rigidity. The peptides that can be used in products of the invention form stable secondary structures upon self-assembly. Preferably, the peptides used in the invention will form long "beta-tapes" comprising a beta-pleated structure of a single molecule in thickness. The peptides may form complex structures during assembly, such as helical tapes (single-molecule thick), twisted ribbons (double tapes), fibrils (twisted stacks of ribbons) and fibers (entwined fibrils). With decreasing pH, helical tapes, twisted ribbons, fibrils and at last fibers may form.

As is known to the skilled person, the assembly state of peptides is also influenced by the ionic strength. The ionic strength of a solution is a function of the concentration of all ions present in that solution. Thus, even at a pH above the pH at which the peptide starts to undergo self-assembly, i.e. when the peptide is substantially monomeric in solution, a particularly high ionic strength might be able to trigger the assembly of the peptide.

However, assembly of the peptides of the present invention is advantageously not triggered when the ionic strength is in the physiological range, i.e. corresponding to or below the ionic strength corresponding to 150 mM NaCl. The skilled person will know how to determine and measure the ionic strength of a solution. The ionic strength I is generally calculated according to the formula $I=\frac{1}{2}\Sigma z_i^2 b_i$, wherein z is the valence factor and $b_i$ is the molality [mol/kg $\{H_2O\}$] of the $i^{th}$ ion concentration. The summation, $\Sigma$, is taken over all ions in a solution. For example, the ionic strength of a 150 mM NaCl solution is approximately 0.15. This is also approximately the ionic strength of blood. The ionic strength of saliva present in the oral cavity is generally much lower, such as e.g. approximately 0.04. Thus, in a preferred embodiment, the ionic strength in the dental care product of the invention is less than 0.15, less than 0.1, less than 0.05, or less than 0.025. In a preferred embodiment, the ionic strength of the dental care product is less than 0.15. In a further preferred embodiment, the ionic strength is less than 0.1.

The skilled person is aware of numerous methods to determine the ionic strength of a preparation. For example, the ionic strength may be estimated from a measurement of the electric conductance ($S=1/\Omega=A/V$) of a solution via the Russell's factor as follows: $I=1.6\times10^{-5}\times$Specific Conductance [$\mu S/cm$]. A 150 mM NaCl solution has a conductance of approximately 80-100 mS/cm. Thus, according to the above and the described estimation of the electric conductance, the dental care product will have an electric conductance of below 100 mS/cm, preferably below 80 mS/cm.

Further, the skilled person is aware of numerous methods to determine the pH at which a peptide of the present invention will start self-assembly at a given ionic strength. Suitable methods are denoted e.g. in a publication by Aggeli et al. (2003, J Am Chem Soc, 125, 9619-9628).

The size of the self-assembling peptides used in the products of the invention is not specifically limited. The peptides of the invention may be of any length that allows self-assembly in a pH-dependent manner. Preferably, the peptides will have a size of about 4-200 amino acids, more preferably, 6-100 amino acids, 8-50 amino acids, 10-30 amino acids or 11-20 amino acids. Even more preferably, the self-assembling peptides will have a length of about 27 amino acids, 24 amino acids, 21 amino acids, 15 amino acids, or 11 amino acids. In a particularly preferred embodiment, the self-assembling peptides have a length of 11 amino acids.

The self-assembling peptides may be prepared by any suitable method that is commonly known in the field of peptide synthesis. For example, peptides with a length of more than 50 amino acids may be prepared by recombinant methods. In one embodiment, the self-assembling peptides are produced as fusion peptides. As used herein, a fusion peptide refers to a fusion of a first amino acid sequence comprising the self-assembling peptide of interest which is N-terminally or C-terminally linked to a second amino acid sequence. The second amino acid sequence may be an affinity tag, i.e. an amino acid sequence that is fused to the N-terminus or C-terminus of the self-assembling peptide and which exhibits an increased affinity to another compound, thereby allowing purification of the fusion peptide. Preferably, the tag sequence is removed from the self-assembling peptide of interest after purification, for example by providing a proteolytic cleavage site between the self-assembling peptide and the affinity tag. In one embodiment, the self-assembling peptide is prepared as disclosed in Kyle et al., 2010, Biomaterials 31, 9395-9405 and Kyle et al. 2009, Trends in Biotechnol. 27 (7), 423-433.

Smaller self-assembling peptides are usually prepared by chemical synthesis. For example, the peptides may be chemically synthesized by solid phase or liquid phase methods. Protocols for solution-phase chemical synthesis of peptides have been described (see, for example, Andersson et al., Biopolymers 55:227-250, 2000). For solid phase synthesis the technique described by Merrifield (J. Am. Chem. Soc., 1964, 85, 2149-2154) may be used. In this approach, the growing peptide is anchored on an insoluble resin, and unreacted soluble reagents are removed by filtration or washing steps without manipulative losses. Solid phase peptide synthesis can be readily performed by use of automated devices.

The peptides used in the products of the invention may comprise any natural, proteinogenic amino acid. In addition, the peptides may also comprise unusual, non-proteinogenic amino acids, such as carnitine, gamma-aminobutyric acid (GABA), hydroxyproline, selenomethionine, hypusine, lanthionine, 2-aminoisobutyric acid, dehydroalanine, ornithine (Orn, O), citrulline, beta alanine (3-aminopropanoic acid), and the like. Non-proteinogenic amino acids can be incorporated into the peptide by post-translational modification or by direct incorporation during chemical synthesis of the peptide.

The peptides preferably comprise amino acid side chains that include a —COOH group. Amino acid side chains with a —COOH will be deprotonated at pH values above their nominal pK values. For example, amino acids which comprise a —COOH group in their side chain such as aspartic acid (Asp, D) and glutamic acid (Glu, E) are essentially deprotonated at a pH above neutral, i.e. at pH 7, because they exhibit a low pKa (Asp: 3.71; Glu: 4.15). In the self-assembling peptides used in the products of the present invention, the amino acid side chains containing a —COOH group are specifically located in the peptide chain so as to control the electrostatic interactions between neighbouring peptides, i.e. so that adjacent, identical, self-assembling peptides are repelled through electrostatic interactions when the —COOH group is deprotonated to —COO—, and to dominate the association free energy in bonds between peptides. Reducing the pH below a certain threshold, i.e. the pH at which the peptide starts to undergo self-assembly, such as about pH 7.5 for P11-4 (SEQ ID NO:1) and modified P11-4 (SEQ ID NO:2), leads to protonation of the —COOH group in the self-assembling peptides of the present invention which reduces the repelling electrostatic interactions between the peptides and allows self-assembly of the peptides.

The peptides used in the products of the invention preferably comprise the sequence of the formula X1-X2-X1-X2-X1, wherein X1 is an amino acid with an acidic side chain, and X2 is an amino acid with a hydrophobic side chain selected from the group consisting of alanine, valine, isoleucine, leucine, methionine, phenylalanine, tyrosine, and tryptophan (SEQ ID NO: 3).

In a more preferred embodiment, the self-assembling peptides used in the products of the invention comprise the sequence Glu-X2-Glu-X2-Glu, wherein X2 is an amino acid with a hydrophobic side chain selected from the group consisting of alanine, valine, isoleucine, leucine, methionine, phenylalanine, tyrosine, and tryptophan (SEQ ID NO: 4) or Asp-X2-Asp-X2-Asp, wherein X2 is an amino acid with a hydrophobic side chain selected from the group consisting of alanine, valine, isoleucine, leucine, methionine, phenylalanine, tyrosine, and tryptophan (SEQ ID NO:5).

In another preferred embodiment, the self-assembling peptides used in the products of the present invention comprise or consist of the sequence Gln-Gln-Arg-Phe-Glu-Trp-Glu-Phe-Glu-Gln-Gln (P11-4, SEQ ID NO:1), or a sequence having at least 80%, preferably 90% sequence identity thereto. It is further preferred that the peptides are modified P11-4 as shown in SEQ ID NO:2 or a sequence having at least 80%, preferably 90% sequence identity thereto.

For the peptides referred to herein as P11-4, the switch from the monomeric to the assembled, multimeric form is controlled by the pH. If the pH is below pH 7.5, the peptide assembles. If the pH is higher, the state of the peptide is monomeric.

The peptide having at least 80% or more sequence identity to SEQ ID NO:1 or 2 preferably comprises glutamic acid, or aspartic acid at positions which correspond to amino acids 5, 7 and 9 of SEQ ID NO:1 or 2. Specifically, the peptide sequence having at least 80% or more sequence identity to SEQ ID NO:1 preferably comprises glutamic acid at positions which correspond to amino acids 5, 7 and 9 of SEQ ID NO:1. Preferably, the remaining amino acid positions are amino acids with a hydrophobic side chain selected from the group consisting of alanine, valine, isoleucine, leucine, methionine, phenylalanine, tyrosine, and tryptophan. Preferably, the remaining amino acid positions are not amino acids that have basic side chains, i.e. amino acids that would be positively charged at a pH around neutral.

In one embodiment, the peptides used in the products of the invention comprise or consist of sequences that differ from those depicted in SEQ ID NOs:1 and 2 by the replacement of 1, 2 or 3 amino acids. Generally, each of the amino acid residues within the peptide sequence of SEQ ID NOs:1 and 2 may be substituted by another residue, as long as the resulting peptide is still capable of undergoing self-assembly at a pH value below 7.5. It is preferred that the substitutions are conservative substitutions, i.e. substitutions of one or more amino acid residues by an amino acid of a similar polarity, which acts as a functional equivalent. Preferably, the amino acid residue used as a substitute is selected from the same group of amino acids as the amino acid residue to be substituted. For example, a hydrophobic residue can be substituted with another hydrophobic residue, or a polar residue can be substituted with another polar residue having the same charge. Functionally homologous amino acids which may be used for a conservative substitution comprise, for example, non-polar amino acids such as glycine, valine, alanine, isoleucine, leucine, methionine, proline, phenylalanine, and tryptophan. Examples of uncharged polar amino acids comprise serine, threonine, glutamine, asparagine, tyrosine and cysteine. Examples of charged polar (basic) amino acids comprise histidine, arginine and lysine. Examples of charged polar (acidic) amino acids comprise aspartic acid and glutamic acid.

Further, the peptides used in the products of the invention may be structurally modified in one or more amino acid positions, e.g. by the introduction of one or more modified amino acids. According to the invention, these modified amino acids may be amino acids that have been changed by e.g. biotinylation, phosphorylation, glycosylation, acetylation, branching and/or cyclization. Further, the peptides of the invention may additionally or alternatively contain other modifications, such as terminal blocking groups, formyl-, gamma-carboxyglutamic acid hydroxyl-, methyl-, phosphoryl-, pyrrolidone carboxylic acid-, and/or sulphate-groups. In a preferred embodiment, the peptides of the invention are acetylated at their N-terminus and/or amidated, e.g. with an $NH_2$-group, at their C-terminal end. A particularly preferred embodiment is a peptide P11-4 that is N-terminally acetylated and C-terminally amidated with a $NH_2$-group, as depicted in the following sequence: $CH_3CO$-QQRFEW-EFEQQ-$NH_2$ (SEQ ID NO:2).

In the dental care products of the present invention, self-assembling peptides are applied to tooth surfaces in a not-assembled state in which they are capable of diffusing into tooth lesions where remineralisation is to be achieved.

The average pH of the saliva of healthy human subjects was found to be about 7.06±0.04, for subjects with chronic gingivitis, 7.24±0.10 while average pH of those having chronic generalized periodontitis was 6.85±0.11 (Baliga et al., 2013. J Indian Soc Periodontol. 17:461-465), wherein the pH is well-buffered, minimizing, e.g., erosion of teeth by acidic food or drink.

In a tooth lesion, the pH is normally between 5.0 and 6.5 or lower as a result from the continuous production of lactic acid by lactic acid bacteria which form the microflora of the oral cavity (Hiraishi, N. et al, 2003, Operative Dentistry 28(5):598-604). As an early caries lesion, e.g. a subsurface caries lesion, has acid conditions and high ionic strength, the self-assembling peptides will start to assemble in situ, forming a three dimensional network. Thus, the pH-induced assembly of the monomeric peptides starts within the lesion, thereby forming multimeric assemblies which can act as scaffolds for subsequent calcium phosphate deposition. This process is also referred to in the context of the invention as polymerisation. After network formation, calcium is attracted from the saliva, generating nucleation islands for the formation of calcium phosphate crystals (hydroxyapatite) in the early caries lesion. Further, the surface area of cavitated caries is very high including deep pits and grooves.

Application of the self-assembling peptides in their monomeric, not-assembled state is particularly critical for treatment of subsurface caries lesions, since the formed scaffolds are too large to diffuse through pores. In order to ensure a sufficient delivery of peptides to the lesion, their assembly has to be prevented until they reach their site of action.

The dental care products of the invention protect the peptides from assembly and ensure monomerisation of the peptides over a prolonged period after application in the oral cavity. Thus, as described above, maintenance of a pH above the pH at which the peptides start to undergo self-assembly is required, preferably until a sufficient amount of peptide monomers is delivered to the site of action, e.g. a tooth lesion.

In the dental care products of the present invention, effective monomerisation may be achieved by using a product having a pH which is more than 0.5 pH units above the pH at which the peptides start to undergo self-assembly. Preferably, the pH in the products of the invention is more than 0.6 pH units above the pH at which the peptides start to undergo self-assembly. Even more preferably, the pH is more than 0.7 pH units above the pH at which the peptides start to undergo self-assembly.

For example, when using the peptides referred to herein as SEQ ID NO:1 or SEQ ID NO:2, the product may have a pH of 8.0 or higher, since self-assembly of these peptides starts at pH 7.5.

Thus, in the product of the invention, the pH may be 7.5-9.0. In a preferred embodiment the pH in the product is 7.8-8.5, more preferably, 8-8.2.

The pH of the dental care product of the invention may be buffered to ensure that a substantial percentage of the self-assembling peptide stays in monomeric form for a sufficient time to ensure that it reaches the sites of potential lesions.

WO 2014/027012 describes production of a composition comprising self-assembling peptides which has a pH 0.1 to 0.5 pH units above the pH at which the peptides starts to undergo self-.assembly. Said compositions are intended for professional application directly to caries lesions. Although the methods disclosed in WO 2014/027012 may be used or adapted for the present invention, the dental care product of the present invention preferably differs from the product produced according to WO 2014/027012, and from the intermediate product of the process disclosed therein comprising a volatile compound which increases the pH.

Suitable buffers for use in the dental care product of the invention include TAPS ({[tris(hydroxymethyl)methyl]amino}propanesulfonic acid), Bicine (N,N-bis (2-hydroxyethyl) glycine), Tris(Tris(hydroxymethyl)-aminomethan), Tricine (N-tris(hydroxymethyl)methylglycine), TAPSO (3-[N-Tris(hydroxyl-methyl)methylamino]-2-hydroxypropanesulfonic acid), HEPES (4-2-hydroxy-ethyl-1-piperazineethanesulfonic acid), TES (2-{[tris (hydroxy-methyl)methyl]amino}ethanesulfonic acid), and other buffers that maintain a similar pH range. Acid buffers, such as citric acid, phosphoric acid, and others may also be used in conjunction with any of the above buffers and/or an alkaline solutions, such as sodium hydroxide, potassium hydroxide, ammonium hydroxide, sodium phosphate di- and tri-basic, potassium phosphate di- and tri-basic, sodium tripolyphosphate, Tris, triethanolamine, polyethylenimine, to obtain the desired pH which is more than 0.5 pH units above the pH at which the peptide starts to undergo self-assembly and to provide buffering capacity. In a preferred embodiment, the buffer to provide a specific pH which is more than 0.5 pH units above the pH at which the peptide starts to undergo self-assembly, such as pH 7.5, is Tris.

In one embodiment, the dental care product of the invention does not comprise mineral particles.

At the high pH of the dental care product of the invention, before application, at least 70%, preferably at least 80%, more preferably at least 90% or at least 95% or at least 99% of the self-assembling peptides are present in a monomeric, non-assembled state.

Alternatively, in the dental care products of the present invention, in particular those with a low water content, or essentially solid products, such as toffees, chewing gum, chewing toy, candy, lozenge, gelatin-gum, toothpowder or biscuit, respective high contents of monomeric peptides may be achieved by adding monomeric peptide to a mixture of the other ingredients, if appropriate after warming the other ingredients to facilitate mixing. The low water content prevents self-assembly.

Upon application to the plurality of teeth in the oral cavity, at least 40%, at least 50%, at least 60%, preferably, at least 70% of the peptides remain in a monomeric form for at least 1 minute. Preferably, said percentage of peptides remains in a monomeric state for at least 2 minutes, at least 3 minutes, at least 5 minutes or at least 10 minutes after application.

In this way, the present invention allows the effective, non-targeted delivery of monomeric peptides present in a monomeric state to a plurality of teeth, preferably to all teeth. The peptides form assemblies, and scaffolds for remineralization only at their site of action, wherein the most preferred sites of action are lesions such as caries lesions. After distribution on the surface of the teeth, a polymeric or assembled film of self-assembling peptides may also form and lead to increased mineralization, and, accordingly, hardness of the tooth surface.

In a particularly preferred embodiment, the dental care product comprises the peptide P11-4 (SEQ ID NO:1) or modified P11-4 as shown in SEQ ID NO:2 and the product has a pH about 8.0 or more, wherein, preferably, the pH is buffered at about 8.0 or more.

In one embodiment, at least 70% of the peptides are present in a monomeric state before application in the oral cavity, wherein at least 50%, preferably at least 60%, more preferably at least 70% of the peptides are present in a monomeric state for at least 1 minute, preferably at least 2 minutes, more preferably at least 3 minutes or at least 5 minutes, after application in the oral cavity.

In another embodiment, at least 80% of the peptides are present in a monomeric state before application in the oral cavity, wherein at least 50%, at least 60%, at least 70% or at least 80% of the peptides are present in a monomeric state for at least 1 minute, preferably at least 2 minutes, more preferably at least 3 minutes or at least 5 minutes, after application in the oral cavity.

In a particularly preferred embodiment, at least 90% of the peptides are present in a monomeric state before application in the oral cavity, wherein at least 50%, at least 60%, at least 70%, at least 80% or at least 90% of the peptides are present in a monomeric state for at least 1 minute, preferably at least 2 minutes, more preferably at least 3 minutes, after application in the oral cavity.

Preferably, at least 90% of the self-assembling peptide are present in monomeric state in the dental care product before application.

Preferably at least 60%, of the self-assembling peptide are present in monomeric state for at least 1 minute, preferably at least 2 minutes, more preferably at least 3 minutes after application in the oral cavity.

The skilled person will be able to determine whether essentially all of the self-assembling peptides are in a monomeric form by means of routine experimentation. For example, the assembly state of the peptides in solution can be determined by nuclear magnetic resonance (NMR), such as $^1$H-NMR, by circular dichroism analysis, by dynamic light scattering (DLS) analysis, diffusing-wave spectroscopy, native electrophoretic methods, viscosity measurements (rheology), Quartz crystal microbalance with dissipation monitoring (QCMD) and the like, preferably by native electrophoretic methods.

The products of the present invention are particularly advantageous, because the loss of significant amounts of peptides due to self-assembly of the peptides outside of the sites of action is avoided. At the same time the products of the present invention facilitate distribution of the necessary concentration of monomeric self-assembling peptides on the teeth, and, if applicable, inside the lesions to enable self-assembly.

To prevent degradation and/or precipitation of the peptides in solution the pH will normally not be increased to a value higher than 10.5. It is commonly known that the chemical properties of a peptide depend on the amino acid sequence. For example, reversible oxidation of cysteine and methionine residues may be accelerated at higher pH, where the thiol is more easily deprotonated and readily forms intra-chain or inter-chain disulfide bonds. The skilled person will be aware of amino acid side chains that are detrimentally affected by a basic pH and be able to determine the maximal pH that keeps the integrity of the self-assembling peptide intact by routine experimentation. For example, this maximal pH may be predicted on the basis of the known properties of each amino acid present in the peptide. Alternatively, biochemical methods, such as electrophoretic methods, may be employed to determine the integrity of the peptide.

It is known to the skilled person that the peptide concentration may influence the assembly of peptides, i.e. a particularly high peptide concentration may trigger assembly ahead of time. Further, an exceptionally low peptide concentration may prevent assembly of the peptides of the invention, i.e. even under low pH conditions as present in tooth lesions and the oral cavity.

The peptide concentration in the dental care product of the invention may be between 0.1 to 50000 mg peptide/kg bulk product, e.g., 1-10000 mg peptide/kg bulk product, 5-1000 mg peptide/kg bulk product, preferably 20 to 500 mg peptide/kg bulk product or 33-100 mg peptide/kg bulk product. The concentration may also be about 100-300 mg/kg bulk product or about 200 mg/kg. The examples below show that such concentrations allow for penetration and concentration of self-assembling peptides in subsurface lesions.

In one embodiment, a self-assembling peptide is encapsulated. In one embodiment of the invention, the self-assembling peptides are encapsulated in soft capsules, e.g. chewing capsules, as disclosed in Example 2. In another embodiment, the self-assembling peptide is micro-encapsulated. The self-assembling peptides used in the products of the invention may be a combination of two complementary self-assembling peptides, wherein preferably the complementary peptides are separated in the product, e.g. by encapsulation of one of the self-assembling peptides, or separate encapsulation of each of the peptides. Preferably the complementary peptides come into contact with each other after application to the teeth, and breakdown of the capsules. Examples for complementary peptides are provided, e.g. in EP 2 327 428 A2. Of course, encapsulation may also be applied if the product comprises a single type of self-assembling peptides, e.g., having SEQ ID NO: 4, SEQ ID NO: 3, SEQ ID NO: 2 or SEQ ID NO: 1, as described above. Preferably, the encapsulated peptide comes into contact with the teeth after mechanical breakdown of the capsules, e.g., by chewing of the dental care product such as a chewing gum, toffee, capsule, biscuit or chew toy, or after mechanical stress due to the application to the teeth, e.g. caused by brushing or flossing.

Suitable methods of encapsulation are provided, e.g. in Nedovic et al, Procedia Food Science 1, 2011, 1806-1815. Preferably, self-assembling peptides of the present invention may be encapsulated by spray drying, extrusion methods, e.g. for alginates as shell material, emulsification, or fluid bed coating on calciumphosphate particles.

Suitable encapsulation shells for self-assembling peptides may comprise starch and derivatives, e.g. amylose, amylopectin, dextrins, maltodextrins, polydextrose, syrups, cellulose and derivatives, plant exudates and extracts, e.g. gum Arabic, gum tragacanth, gum karaya, mesquite gum, galactomannans, pectins and soluble soybean polysaccharides, marine extracts, e.g. carrageenans and alginate, microbial and animal polysaccharides, e.g. dextran, chitosan, xanthan and gellan, proteins, e.g. milk and whey proteins such as caseins, gelatine and gluten, lipid materials suitable for food applications, e.g. fatty acids and fatty alcohols, waxes such as beeswax, carnauba wax and candellia wax, glycerides and phospholipids, or other materials such as PVP, paraffin, shellac, inorganic materials.

The present invention provides dental care products suitable for any of the above mentioned uses. Dental care products of the invention may be solid, semi-solid or liquid. In particular, the dental care product may be selected from the group comprising candy, lozenge, gelatin-gum, toffee, chewing gum, biscuit, capsule, chew toy, paste, e.g., toothpaste, gel, e.g., toothgel, prophylactic paste, toothpowder, mouthwash, mouthspray, solution, coated dental floss, coated interdental brush or coated toothbrush. Preferably, the dental care product is a toffee or a chewing gum, most preferably a toffee.

A dental care product of the invention requiring or allowing for chewing, such as candy, lozenge, gelatin-gum, toffee, chewing gum, biscuit or chew toy, in particular, such forms associated with a long (e.g., 5 min or more) application such as chewing gum (for humans) or chew toy (for animals), are associated with particular advantages, as their use may at the same time reduce biofilm or plaque, and thus facilitate access to tooth surfaces and potential lesions. Such products also increase salivation. Ions contained in the saliva, e.g. calcium ions, are thus attracted and generate nucleation islands for the formation of calciumphosphate crystals in potential tooth lesions. For example, a candy, lozenge, gelatin-gum, chewing-gum, biscuit or capsule of the invention can also be used for preventing and/or treating a tooth lesion and/or remineralising tooth surfaces in a child.

Chew toys or biscuits may be particularly suitable forms of the dental care product suitable for animal use, e.g., for pets such as for cats, dogs or horses, in particular, dogs. Chew toys may be coated with the self-assembling peptides, and/or may incorporate them. Such embodiments provide access to treatment and prevention means for tooth lesions for animals at low cost and effort. Side effects of caries lesions such as bad breath of animals, in particular, dogs, may thus also be prevented by means of the dental care product of the invention.

Dental care products typically used for dental hygiene such as toothpaste, toothgel, prophylactic paste, toothpowder, mouthwash, mouthspray, solution, coated dental floss, coated interdental brush or coated toothbrush reduce dental plaque and also facilitate access to the tooth surface. They can also access spaces between teeth, and are thus especially suitable for preventing or treating caries in such locations, in particular, coated dental floss or coated interdental brushes. Such products of the invention are thus particularly intended for preventing and/or treating tooth lesions in places that are hard to reach and therefore susceptible to caries infiltration, e.g. in interdental spaces.

Dental care products of the invention are applied for at least 1 minute. Preferably, products of the invention are applied for at least 3 minutes, more preferably for at least 5 minutes, or most preferably for at least 10 minutes. Application means that a plurality of teeth, or, preferably, all teeth of a subject are contacted with the dental care product in the way this respective type of product is typically used. For example, a toothpaste is typically used to brush teeth for a time of 1-5 minutes, in particular, about 2-3 minutes.

The dental care product may be used after normal dental care, e.g. in the evening after brushing teeth. Preferably, the dental care product may be used instead of a normally applied product, e.g. instead of a normal toothpaste or instead of normal dental floss.

The dental care product of the invention is for application at least once a week. The product may be for application at least twice a week, preferably, at least daily, e.g., once a day, at least twice a day, or at least three times a day, for example, after a meal. The product preferably is administered for at least a week, at least two weeks, at least three weeks, at least four weeks, at least a month, at least 2 months, at least 6 months, or for at least a year. The product can be administered for the rest of the lifetime, e.g., daily.

Dental care products of the invention are effective in treating or preventing a tooth lesion, and/or in remineralising a tooth surface and/or in increasing hardness, e.g. microhardness, of a tooth surface in a subject after daily administration for at least a month, at least two weeks, or at least a week. For example, microhardness, e.g., microhardness of demineralised teeth, may be increased by at least 10%, preferably, by at least 20%, at least 30%, or at least 40% upon daily administration for four weeks. Microhardness, e.g, Vickers hardness or Knoop hardness, preferably, Knoop hardness, may be measured, e.g., by methods described in Chuenarron et al. (2009, Materials Research 12(4), 473-476), wherein the indentation load preferably is 100 g.

The dental care product of the invention may be applied manually or mechanically, e.g. using an electrical toothbrush or an oral irrigator. Further, it can be mixed with additional compounds that assist in the administration of the monomeric peptides to the site of treatment, i.e. the tooth lesion or tooth surface.

The dental care product typically comprises one or more typical ingredients of the respective dental care product, e.g. typical pharmaceutically acceptable bases having the required pH, wherein the self-assembling peptides may be incorporated.

The pharmaceutically acceptable bases of dental care products of the invention may comprise abrasive agents, e.g. carbonates, phosphates, in particular, dicalcium phosphate, silicates, acrylates, alumina, and/or biofilm removing agents, e.g. sodium carbonate, SDS and/or phosphate buffer. These agents allow for a removal of the pellicle, thus enabling a better penetration of the self-assembling peptide.

Typically, the dental care product alone is thus capable of sufficient removal of biofilm or pellicle from the teeth. It is possible that, additionally, the teeth may be cleaned before use of the dental care product of the invention, e.g., by tooth brushing (e.g., with a manual toothbrush or an electric toothbrush, preferably, with a sonic toothbrush), flossing of teeth, use of an oral irrigator, and/or rinsing with a salt and detergent solution, which may, optionally, have a pH at which at least 50% of the self-assembling peptide used in the product is monomeric. As the inventors could show that tooth brushing with a sonic toothbrush surprisingly improves uptake of self-assembling peptide into subsurface lesions, preferably, such cleaning comprises sonification, and, in particular, may be carried out by tooth brushing with a sonic toothbrush.

A sonic toothbrush generates brush head speeds in the sonic range or above, i.e., it vibrates at least at a speed that lies within the range of frequencies that humans can hear, i.e., from about 70 to 20,000 hz, preferably, about 100 to about 1000 Hz. Typical sonic toothbrushes vibrate at a frequency of about 200 to about 400 Hz. The term "sonic toothbrush" in the context of the application, if not specified otherwise, includes an ultrasonic toothbrush. Ultrasonic toothbrushes vibrate at a frequency of more than 20,000 Hz, preferably, about 1-2 MHz or about 1.6 MHz, which translates to 192,000,000 movements per minute. For example, a Sonicare® toothbrush may be able to carry out 31,000 brush strokes per minute, which corresponds to about 258 hz. For comparison, non-sonic electric toothbrushes have a brushing mechanism that generates on the order of 2,500-7,500 strokes per minute. The intense vibrational speed of a sonic brush's bristles agitates the fluids that surround the user's teeth the degree that they can disrupt dental plaque even beyond where the bristles of the brush actually touch (https://www.animated-teeth.com/electric_toothbrushes/t3_sonic_toothbrushes.htm). Exemplary sonic toothbrushes are available from Philips (e.g., Sonicare® toothbrushes) or Oral B.

To improve taste and acceptance of the products, dental care products of the invention may comprise sugar and/or sugar substitutes, which, preferably, do not promote tooth decay, e.g., polyols or sugar alcohols such as sorbitol, mannitol, maltitol, lactitol, isomalt, xylitol and/or erythritol, or D-tagatose and/or trehalose. Preferably, the products are sugar-free products, i.e., they do not comprise sucrose or glucose in significant amounts, or not at all. Sugar-free products based on suitable modifications of preparations disclosed e.g., by Zumbé et al., 2001, British Journal of Nutrition 85, Suppl. 1, S31-S45, further comprising the self-assembling peptides and with a pH controlled to ensure monomeric state of the peptides, as disclosed herein, e.g., by choice of appropriate buffers and pH, may be used.

It is particularly advantageous if the dental care product, in addition to the self-assembling peptides, comprises xylitol (D-xylit), which has been shown to be anti-cariogenic and helpful for remineralization of teeth. It also reduces biofilm and plaque and thus facilitates access of the self-assembling peptides of the invention to the tooth surface and potential lesions. Of course, xylitol is not used for application in dogs, cows, goats, rabbits or other animals for which the substance is toxic. Xylitol can be used in products of the invention for use in human subjects or e.g., cats, preferably, human subjects.

Toothpastes according to the invention may be prepared, e.g., according to WO 2004/069170 A1. Typical pharmaceutical bases for, e.g. toothpastes of the invention, may additionally comprise, e.g., abrasive agents such as carbonates, phosphates, silicates, acrylates, alumina, suspension agents such as glycerine, polyethylene glycols (PEG), sorbitol, xylitol, binding agents such as cellulose and derivatives thereof, carrageenan, paraffin, xylose, detergents such as hydrogenated castor oil, sodium lauryl sulphate, aroma such as caramel, vanillin, menthol, conserving agents such as ethanol, sodium benzoate, coloring agents such as solvent red, acid blue 3, active agents such as fluorides, preferably, in the form of tertiary amines, such as amine fluoride or organic fluoride such as sodium monofluorophosphate, potassium nitrate, and/or oxalate. Toothpastes of the invention may comprise free (i.e., non-encapsulated) self-assembling peptides. Toothpastes of the invention may additionally or alternatively comprise at least one self-assembling peptide in encapsulated form, which may come into contact with the teeth after mechanical stress e.g., due to brushing.

Pharmaceutically acceptable bases for, e.g. toothgels of the invention, may comprise, e.g., suspension agents such as glycerine, polyethylene glycols (PEG), sorbitol, xylitol, binding agents such as cellulose and derivatives thereof, carrageenan, paraffin, xylose, detergents such as hydrogenated castor oil, sodium lauryl sulphate, aroma such as caramel, vanillin, menthol, conserving agent such as ethanol, sodium benzoate, coloring agents such as solvent red, acid blue 3, active agents such as fluorides, preferably, in the form of tertiary amines, such as amine fluoride or organic fluoride such as sodium monofluorophosphat, potassium nitrate, and/or oxalate. Toothgels of the invention may comprise free self-assembling peptides. Optionally, toothgels of the invention may comprise at least one self-assembling peptide in encapsulated form, which may come into contact with the teeth after mechanical stress e.g., due to brushing.

Pharmaceutically acceptable bases for, e.g. toothpowders of the invention, may comprise, e.g., baking soda to remove stains, calcium powder as abrasive, aroma such as caramel, vanillin, menthol, conserving agents such as ethanol, sodium benzoate, coloring agents such as solvent red, acid blue 3, active agents such as fluorides, preferably, in the form of tertiary amines, such as amine fluoride, or organic fluoride such as sodium monofluorophosphate, potassium nitrate, and/or oxalate.

Pharmaceutically acceptable bases for, e.g. a gelatin-gum of the invention, may comprise, e.g., gelatin and/or pectin, water, a sugar or a sugar substitute, e.g., in the form of a syrup, tartaric acid and/or citric acid. Gelatin-gums of the invention may comprise free self-assembling peptides, wherein, optionally, at least one self-assembling peptide is incorporated in encapsulated form. Gelatin-gums of the invention may also be coated with the self-assembling peptides. Exemplary sugar-free gelatin gums and their preparation are taught in Zumbé et al., 2001, British Journal of Nutrition 85, Suppl. 1, S31-S45, in particular, in Table 13 or Table 14, wherein self-assembling peptides are added and the pH adapted to ensure their monomeric state.

Chewing gums of the invention may be hard or soft chewing gums. Soft chewing gums containing self-assembling peptides may be prepared, e.g., according to Shivang A Chaudhary et al., Int J Pharm Investig. 2012 July-September; 2(3); 123-133; Abolfazl Aslani et al., Adv Biomed Res. 2013, 2:72; Zumbé et al., 2001, British Journal of Nutrition 85, Suppl. 1, S31-S45 (in particular, FIG. 8); WO2014/152952A1; WO2006/127559A2 or WO2007/143989A1. Hard chewing gums may e.g. comprise, e.g., gum base, xylit, self-assembling peptide, e.g., P11-4 (for example, about 100 µg/chewing gum), sodium bicarbonate, tartaric acid, aroma, e.g., lemon aroma.

Toffees comprise an emulsion of fat in an aqueous system. A peptide toffee of the invention typically comprises, in addition to the self-assembling peptide, a sugar or sugar substitute, e.g. maltitol, sorbitol, xylitol, lactitol and/or isomalt, optionally, at least partially in the form of a syrup such as maltitol syrup, a plant oil, e.g. coconut oil, soybean oil, sunflower oil, rapeseed oil, olive oil, and/or peanut oil, a gelling agent such as gelatin and/or pectin, and, optionally, vitamins, antioxidants, e.g. citric acid and/or ascorbic acid, flavors, colorants, sweeteners, e.g. acesulfame K, aspartame and/or sucralose. Exemplary sugar-free toffees and their preparation are taught in Zumbé et al., 2001, British Journal of Nutrition 85, Suppl. 1, S31-S45, in particular, in Table 12, wherein self-assembling peptides are added and the pH adapted to ensure their monomeric state.

A peptide lozenge of the invention may comprise, in addition to the self-assembling peptide, a sugar or sugar substitute, e.g. maltitol, sorbitol, xylitol, lactitol and/or isomalt, and optionally, ingredients such as an anti-oxidant, e.g. citric acid and/or ascorbic acid, flavor, colorants and sweeteners, e.g. aspartame, acesulfame K and sucralose.

In one embodiment, solid products of the invention such as toffees, chewing gums or lozenges of the invention comprise an outer shell which contributes to removal of biofilm and/or pellicle, e.g., comprising an abrasive such as dicalcium phosphate and/or a biofilm removing agent such as sodium carbonate, SDS and/or phosphate buffer. An inner core may comprise the self-assembling peptides dissolved in a buffered basic environment, e.g., pH 7.6-9 or about pH 8 (cf. FIG. 1A, 2C, 3B). Optionally, an inner core may comprise the self-assembling peptides in encapsulated form in a buffered, basic environment (cf. FIG. 1B, 2D, 3C).

Gelatin-gums of the invention may comprise abrasive agents, e.g. dicalcium phosphate, and/or biofilm removing agents, e.g. sodium carbonate, SDS and/or phosphate buffer, and the self-assembling peptide in a basic environment, e.g. pH 7.6-9 or about pH 8 (cf. FIGS. 4A and B).

Soft capsules of the invention may comprise lipophilic bases, e.g. medium chain triglycerides, waxes such as beeswax, emulsifiers such as soybean lecithin, gelling agents such as silicon dioxide (cf. Example 2 and FIG. 5).

The following examples are intended to illustrate, but not to limit the invention. All references cited herein are herewith fully incorporated.

BRIEF DESCRIPTION OF THE FIGURES

FIG. 1 shows exemplary lozenges of the invention. FIG. 1B shows a lozenge consisting of an outer shell (A) comprising abrasive agents, e.g., dicalcium phosphate and biofilm removing agents, e.g. sodium carbonate, SDS, and/or phosphate buffer, wherein the monomeric self-assembling peptide is present in encapsulated form in a buffered, basic environment, e.g. at pH 8 (B).

FIG. 2 illustrates exemplary toffees of the invention. FIG. 2B shows a toffee comprising abrasive agents, e.g. dicalcium phosphate and biofilm removing agents e.g sodium carbonate and SDS, whereas monomeric self-assembling peptide is incorporated in encapsulated form in the basic buffered toffee. FIG. 2C shows a toffee consisting of an outer shell (A) comprising abrasive agents, e.g. dicalcium phosphate and biofilm removing agents, e.g. sodium carbonate, SDS, and/or phosphate buffer, wherein the monomeric self-assembling peptide is dissolved in a buffered, basic environment, e.g. at pH 8, (B). FIG. 2D shows a toffee consisting of an outer shell (A) comprising abrasive agents, e.g. dicalcium phosphate and biofilm removing agents, e.g. sodium carbonate, SDS, and/or phosphate buffer, wherein the monomeric self-assembling peptide is present in encapsulated form in a buffered, basic environment, e.g. at pH 8 (B).

FIG. 3 shows chewing gums of the invention. FIG. 3B shows a chewing gum consisting of an outer shell (A) comprising abrasive agents, e.g. dicalcium phosphate and biofilm removing agents, e.g. sodium carbonate, SDS, and/or phosphate buffer, wherein the monomeric self-assembling peptide is dissolved in a buffered, basic environment, e.g. at pH 8, (B). FIG. 3C shows a chewing gum consisting of an outer shell (A) comprising abrasive agents, e.g. dicalcium phosphate and biofilm removing agents, e.g. sodium carbonate, SDS, and/or phosphate buffer, wherein the monomeric self-assembling peptide is present in encapsulated form in a buffered, basic environment, e.g. at pH 8 (B).

FIG. 4 shows gelatin gums of the invention. FIG. 4B illustrates a gelatin gum comprising abrasive agents, e.g. dicalcium phosphate and biofilm removing agents, e.g. sodium carbonate, SDS and/or phosphate buffer, wherein the gelatin gum contains monomeric self-assembling peptide in encapsulated form in basic environment, e.g. at pH 8.

FIG. 5 B shows exemplary toffees of the invention prepared according to Example 1 containing 230 mg/kg P11-4, which were used in Example 5.

Squares (top line of symbols)–NaCl: Tris (0.055 M)+NaCl, final ionic strength 142 mM;

Artificial saliva (second line of symbols from top): Tris, $Ca(NO_3)_2$, $KH_2PO_4$ (ratio 0.77:0.14:0.08), ionic strength 142 mM;

Dulbecco's Modified Eagle Medium (DMEM): NaCl, NaHCO$_3$, KCl, CaCl$_2$, MgSO$_4$ (ratio 0.66:0.4:0.05: 0.02:0.007), ionic strength 165 mM;

MgSO$_4$: 0.055 M Tris+0.192 M MgSO$_4$ 0.14 M Ionic strength

Figure 7:
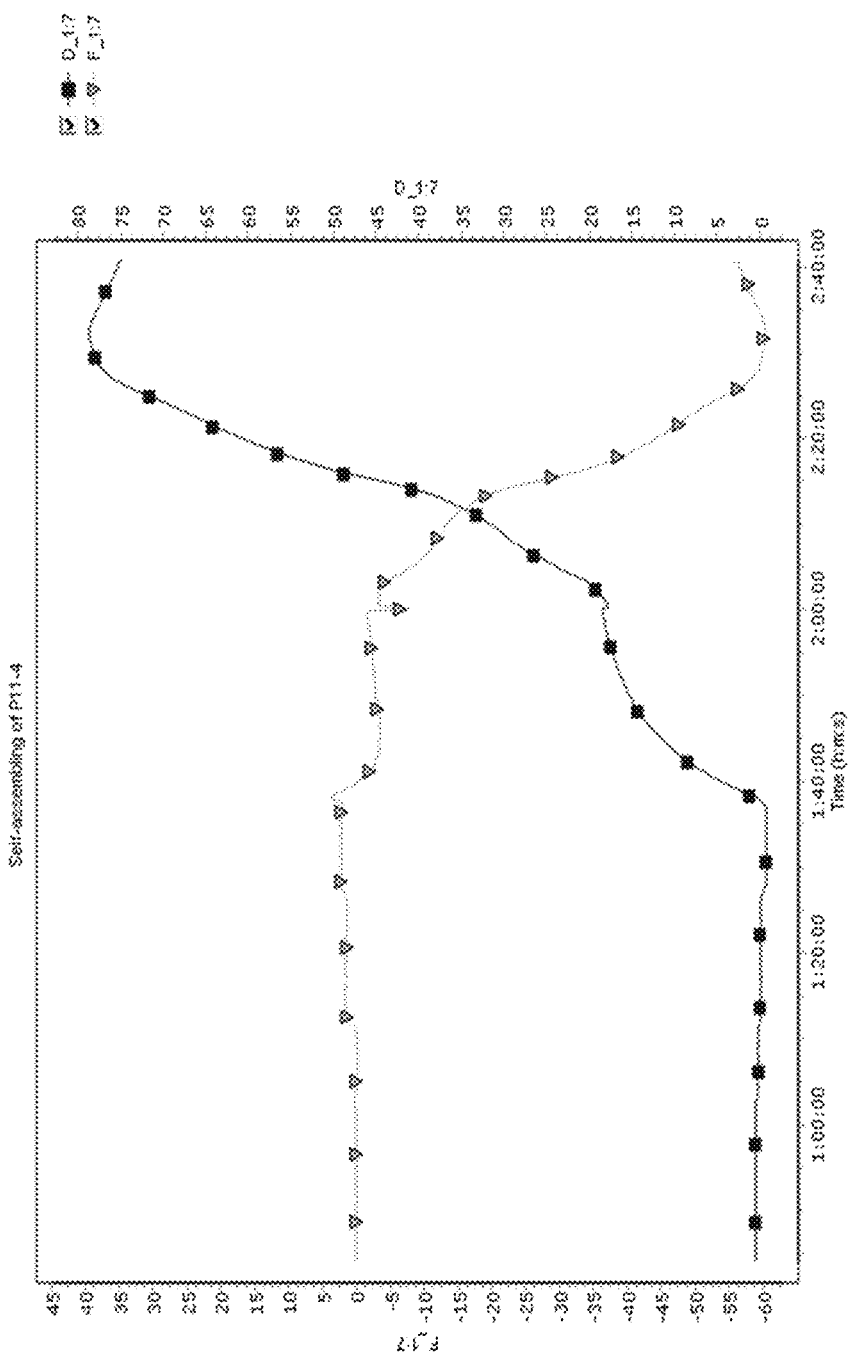

FIG. 7 shows self-assembling kinetic studies with quartz crystal microbalance with dissipation monitoring (QCM-D) over 4 hours. P11-4 peptide was layered on the surface of the amine-coupling sensor at 1 mg/ml in PBS at pH8.5. After 1 hour and 1 hour 25 minutes, the sensor was washed with PBS pH 8.5. After 1 hour and 38 minutes, 10 mg/ml P11-4 peptide in PBS pH 8.5 were injected. After 2 hours, 0.1 M HCl were injected to induce self-assembly.

It can be seen that essentially complete self-assembly has occurred about 30 min after injection of 0.1 M HCl. Resonance frequency F (left scale, Hz) and energy dissipation factor D (right scale), triangle=frequency, square=dissipation are shown.

Figure 8:
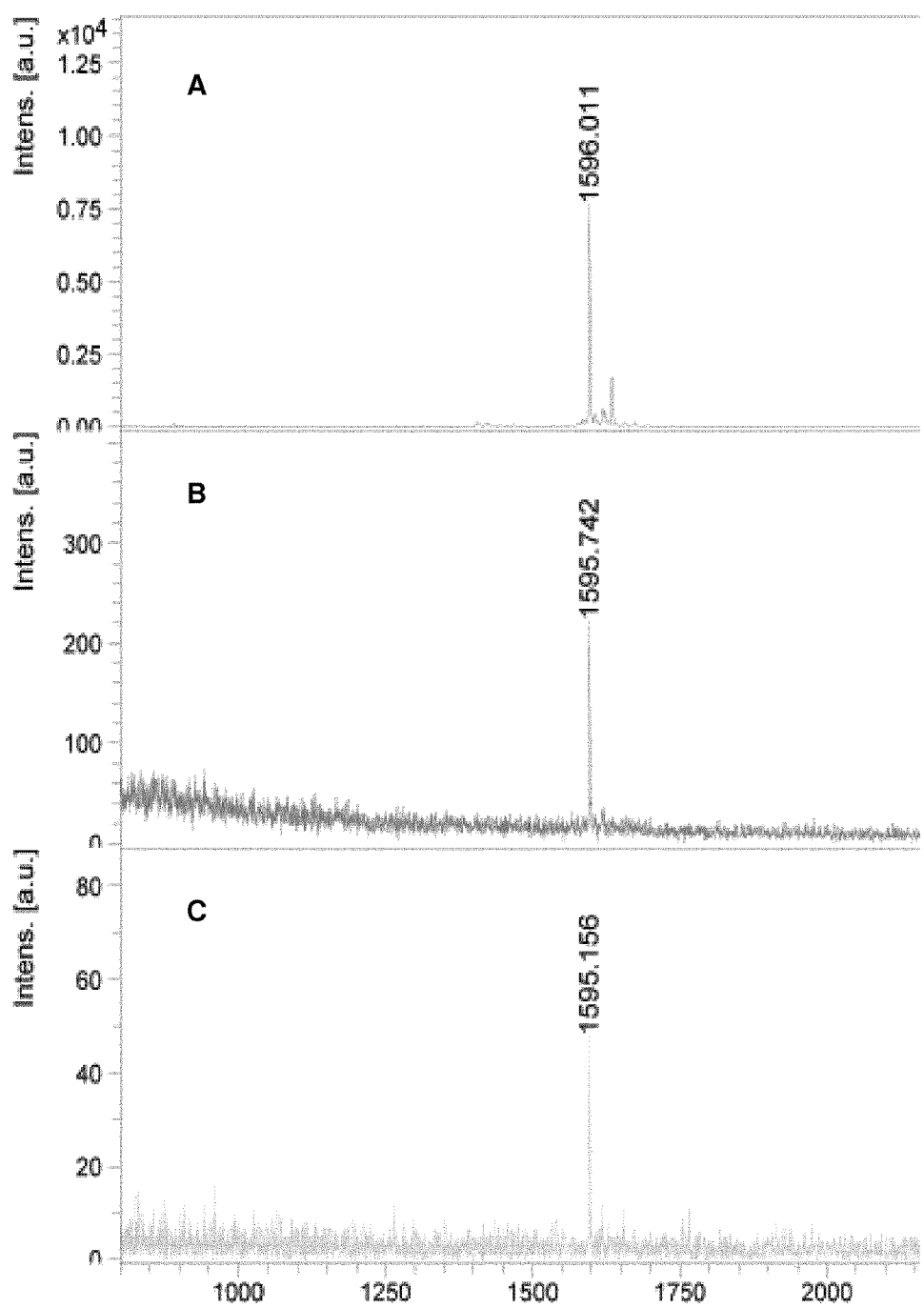

FIG. 8 shows transfer of peptide from chewing gum to tooth. A chewing gum of the invention comprising P11-4 was incubated with a tooth as described in detail in Example 6. A shows a MALDI-TOV analysis of peptide P11-4 in water as a standard, B shows the presence of said peptide in drilling dust of the tooth after 2 h of incubation and C shows the presence of said peptide in the supernatant after 2 h of incubation.

Figure 9A:
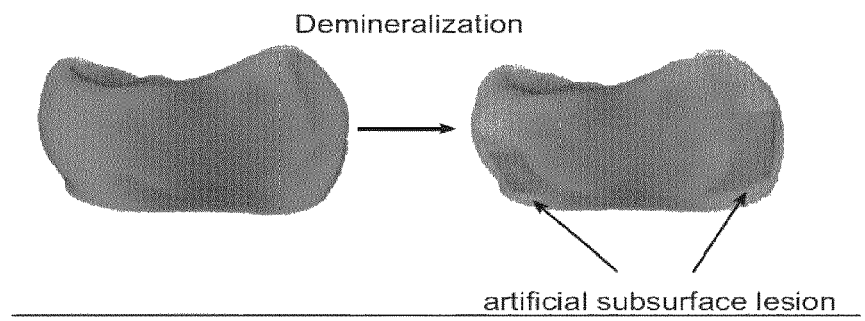
Figure 9B:
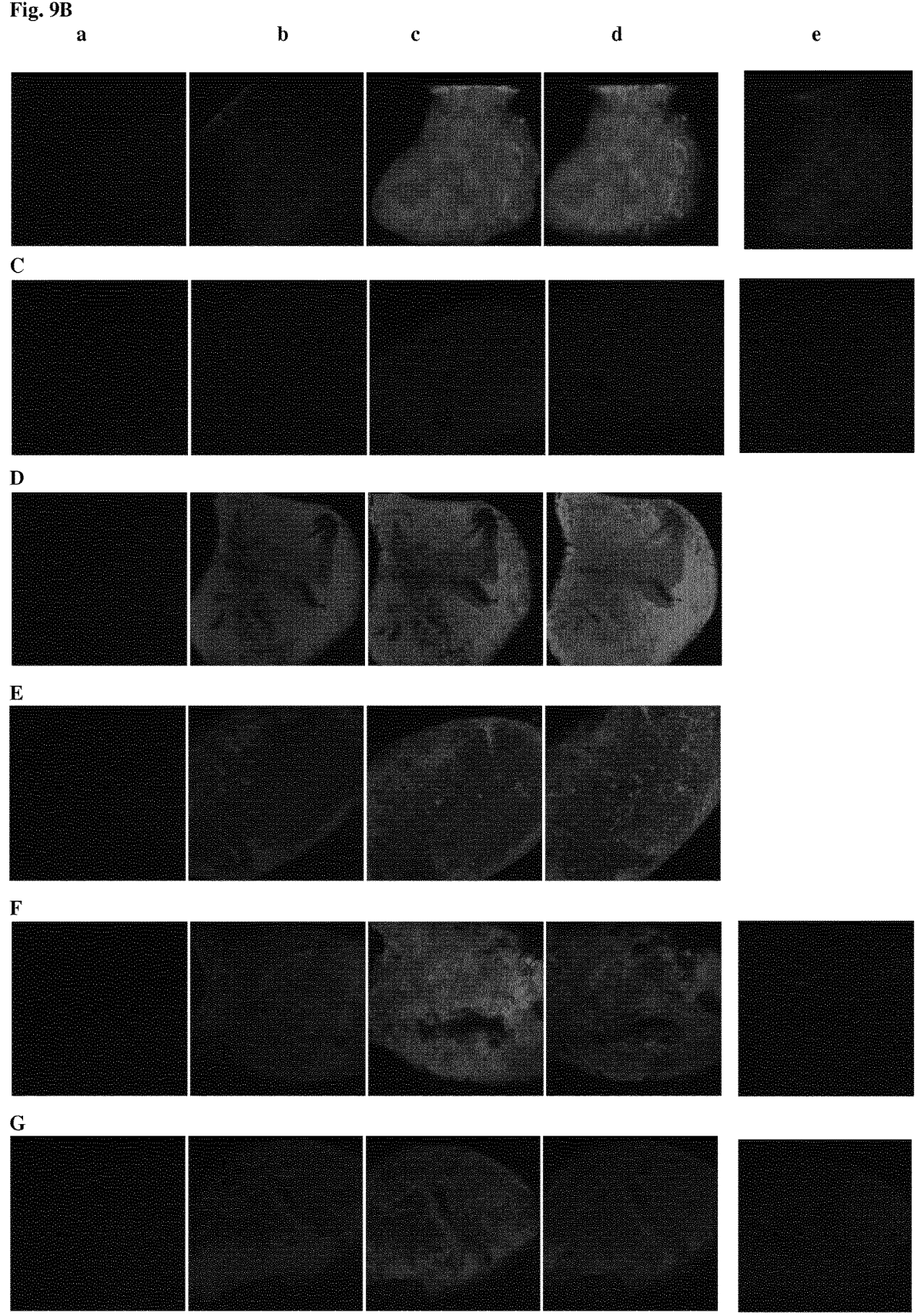

FIG. 9A shows generation of artificial lesions in extracted human molars. FIGS. 9B, C, D and E show penetration of fluorescence-marked peptide P11-4 into artificial lesions after incubation with the peptide at pH 8.4-8.5. FIGS. 9F and G show fluorescence-marked peptide P11-4 after incubation with the peptide at pH 6.3-6.8. Confocal pictures show detection of labelled peptide at 4× magnification before incubation (a), after 1 min incubation (b), 2 min incubation (c), 5 min incubation (d) and after 4 days' washing in remineralization buffer (e). FIGS. 9C, D, E and G shows fluorescence-marked peptide P11-4, wherein incubation with peptide was after pre-incubation of the tooth with human saliva. In FIGS. 9D and E, the pellicle formed by saliva was removed before incubation with the P11-4 by NaClO (FIG. 9D) and sonication (FIG. 9E). The experiments are described in detail in Example 7.

EXAMPLES

Example 1: Preparation of a Peptide Toffee

Toffees of the invention were compounded as follows:

| Ingredient | % (w/w) |
|---|---|
| Maltitol syrup | 49.00 |
| Isomalt | 31.00 |
| Coconut oil | 5.50 |
| Gelatine | 3.00 |
| Vitamin mixture | 1.25 |
| Citric acid | 0.90 |
| Flavour, e.g., raspberry flavour | 0.85 |
| Peptide P11-4 | e.g., 0.03 to 0.25 |
| Colorant (e.g., anthocyanes) | 0.02 |
| Acesulfame K | 0.01 |
| Sucralose | 0.004 |
| Water | ad 100 |

All ingredients except for the peptide P11-4 were warmed. Monomeric peptide in powder form was added and all ingredients mixed. Toffees were formed. Toffees were employed for the chewing test in Example 5.

Due to the low water content, the peptide stays in monomeric form. This applies even though the dry peptide is compounded with citric acid. Assembly can only occur after contact with saliva. Toffees were employed for Example 5.

Example 2: Encapsulation of Peptides

Self-assembling peptides were encapsulated in soft-gelatin capsules as follows.

Figure 1A:
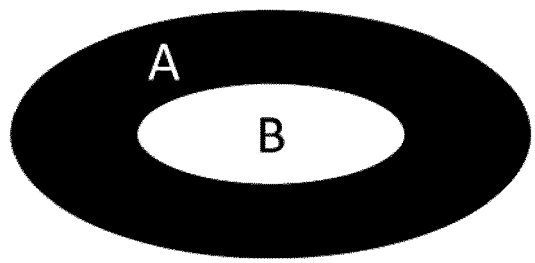
FIG. 1A shows a lozenge consisting of an outer shell (A) comprising abrasive agents, e.g., dicalcium phosphate and biofilm removing agents, e.g. sodium carbonate, SDS, and/or phosphate buffer, wherein the monomeric self-assembling peptide is dissolved in a buffered, basic environment, e.g., at pH 8 (B).
Figure 1A:
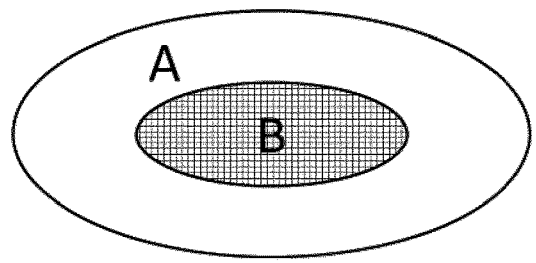
Figure 2A:
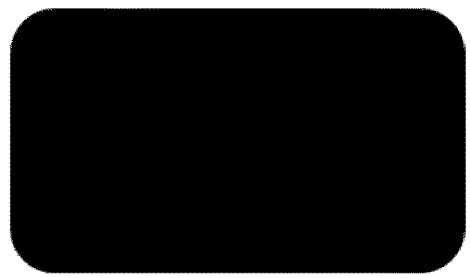
FIG. 2A shows a toffee comprising abrasive agents, e.g. dicalcium phosphate and biofilm removing agents, e.g., sodium carbonate and SDS, whereas monomeric self-assembling peptide is incorporated in the basic buffered toffee.
Figure 2A:
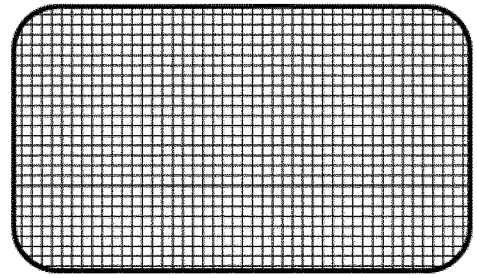
Figure 2A:
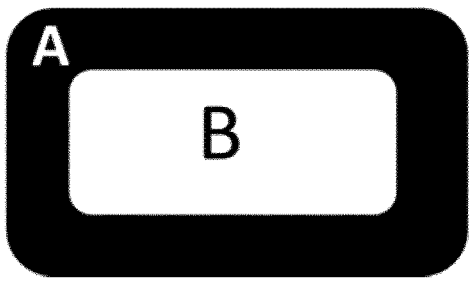
Figure 2A:
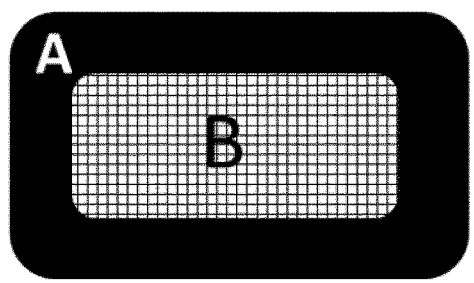
Figure 3A:
FIG. 3A illustrates a chewing gum comprising abrasive agents, e.g. dicalcium phosphate and biofilm removing agents, e.g. sodium carbonate, SDS and/or phosphate buffer, wherein the chewing gum contains monomeric self-assembling peptide in a basic environment, e.g. at pH 8.
Figure 3A:
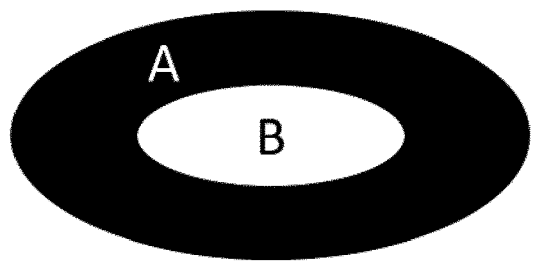
Figure 3A:
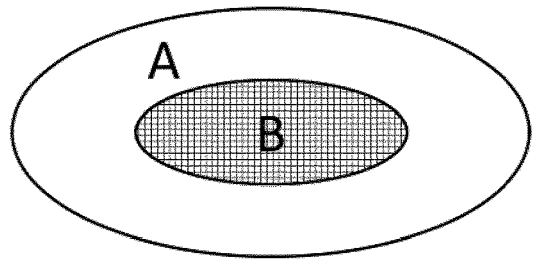
Figure 4A:
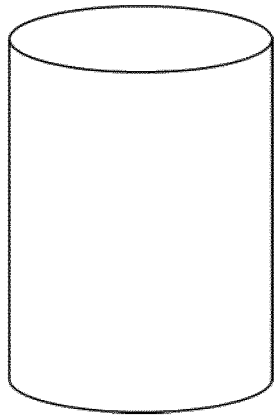
FIG. 4A illustrates a gelatin gum comprising abrasive agents e.g. dicalcium phosphate and biofilm removing agents, e.g. sodium carbonate, SDS and/or phosphate buffer, wherein the gelatin gum contains monomeric self-assembling peptide in a basic environment, e.g. at pH 8.
Figure 4A:
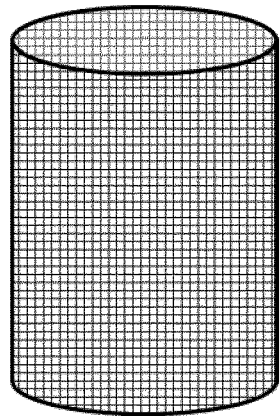
Figure 5:
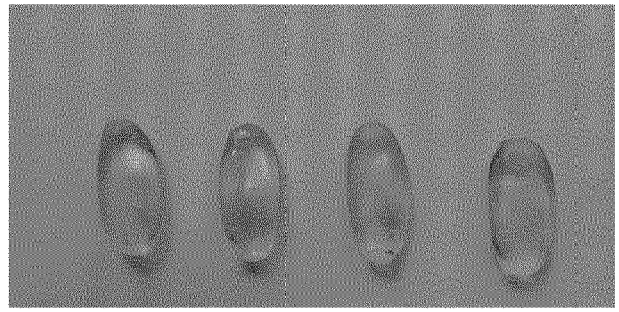
FIG. 5 A shows soft capsules comprising self-assembling peptides. The capsules were produced as indicated in Example 2.
Figure 5:
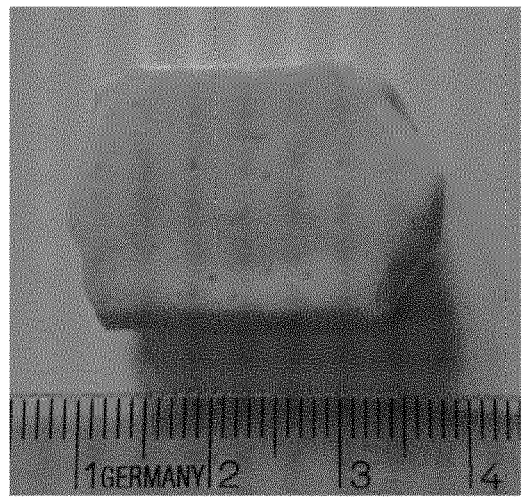
Figure 6:
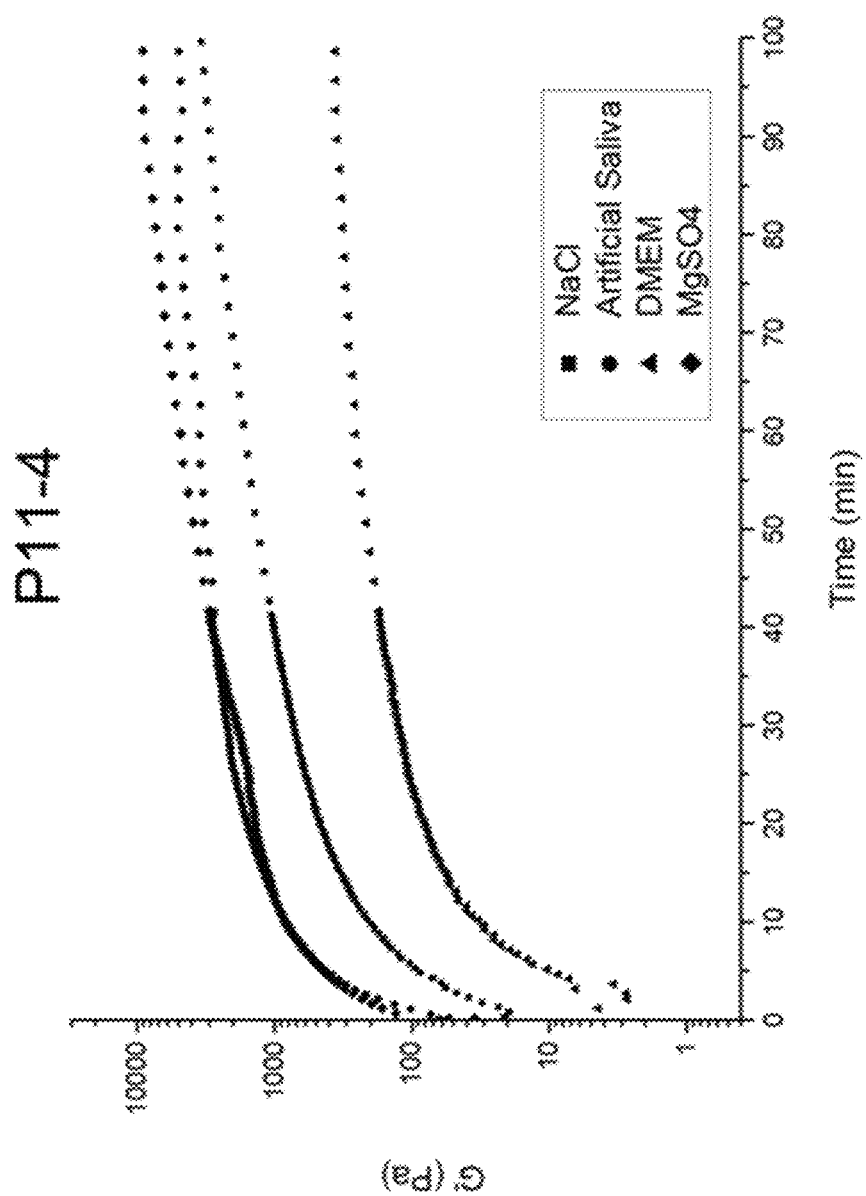
FIG. 6 shows self-assembling kinetic of P11-4, assessed by measurements of elastic modulus G'. P11-4 was prepared at 15 mg/ml with different buffer compositions (see below) measured at 0.1% strain, 37° C. and a frequency of 1 rad/second. Self-assembly of peptide monomers to polymers takes more than 5 min independent of the used ionic strength at neutral pH.

Filling material comprising the self-assembling peptides, MCT oil, soybean lecithin, beeswax and silicon dioxide in amounts indicated below was prepared and encapsulated. The solution for the capsule shells comprised, e.g. gelatine, glycerine, sorbitol and, optionally, colorants. Capsules were dried subsequently, and may be packaged. Resulting capsules are shown in FIG. 5 A.

| Ingredient | mg/capsule |
|---|---|
| Peptide P11-4 | 1 |
| MCT oil | 829 |
| Soybean lecithin | 35 |
| Beeswax | 120 |
| Silicon dioxide | 15 |

Example 3: Preparation of Peptide Chewing Gum

Exemplary chewing gums of the invention may be prepared, e.g., according to Zumbé et al., 2001, British Journal of Nutrition 85, Suppl. 1, S31-S45, FIG. 8. Peptide in monomeric form is added after all other ingredients are mixed.

| Ingredient | % w/w |
|---|---|
| Peptide | 0.01 |
| Milled xylitol | 20 |
| Sorbitol syrup | 15.2 |
| Glycerine | 2 |
| Flavour | 1.8 |
| Baking Soda | 1 |
| Aspartame | 0.05 |
| Milled sorbitol | 35.0 |
| Gum base | ad 100 |

Example 4: Preparation of a Toothpaste

A toothpaste may be prepared according to WO2004/069170.

| Ingredient | % (w/w) |
|---|---|
| Sorbitol (70%) | 43.00 |
| CaCO$_3$ | 14.50 |
| Glycerin | 9.60 |
| Sodium lauryl sulfate | 0.34 |
| Na monofluorophosphate | 0.75 |
| Xanthan Gum | 0.36 |
| Cassia Gum | 0.04 |
| Carbopol 980 NF Polymer | 0.4 |
| Na saccharin | 0.2 |
| Peptide | 0.05 |
| Buffer | 0.1 |
| Baking Soda | 1 |
| Deionized water | ad 100 |
| pH | 8.2 |

Example 5: Chewing Test

Groups of four subjects were given either a toffee containing 30 mg/kg (group A) and 230 mg/kg (group B) monomeric self-assembling peptide P11-4 and group C with no peptide in it (Placebo). Each subject chewed the toffee for 5 min and reported regarding the sensoric experience without knowledge of the content of peptide.

The toffee had a nice texture and pleasant taste. All members of groups A and B reported a smooth, clean feeling on the tooth surface while and after chewing the toffee, whereas group C did not report such a finding. Within the two peptide containing groups A and B, group B showed a faster onset of the smooth feeling.

Example 6: Transfer of Peptide from Chewing Gum to Tooth

A chewing gum of the invention comprising P11-4, prepared according to Example 3, was cut into pieces of 4-5 mm particle size and then chewed with a denture either in water or remineralization buffer ((2 mM Ca(NO3), 1.2 mM KHPO4, and 60 mM Tris/HCl, pH adjusted to 7.4 with 1 M KOH) for 5 minutes. The resulting "saliva" with extracted peptide was then used to incubate a human tooth in it at 37° C. for about 2 h on a shaker.

After incubation, the tooth was air dried and the upper enamel layer mechanically extracted with a high speed drill. The resulting dust was suspended in 200 µl of distilled water adapted to pH 8 with ammonia, followed by purification with Cleanup C18 Pipette Tips. The tips were rinsed twice with 10 µl with 50 wt % acetonitrile in $H_2O$, then 2× with 10 µl 0.1M triethylammonium acetate in $H_2O$+1% 1M $NH_4OH$ and then 3×0.1% TFA in $H_2O$. The sample was eluted with 10 µl 50% acetonitrile in $H_2O$.

The sample holder MTP384 was prepared with 1.5 µl matrix (20 mg/ml 3,5-Dimethoxy-4-hydroxycinnamonacid in $H_2O$/Acetonitrile (1:1)+0.1% TFA), loaded with 1.5 µl sample solution on the matrix. On a separate spot, 2 µl of the calibration standard were placed. Then the Mass spectra over a mass/charge (m/z) ratio of 520-3200 was acquired with a $N_2$-laser, λ=337 nm, Laser power 22%, laser shots over 5 sides on each sample and calculated with FlexControl (Version 2.4) and FlexAnalysis (Version 2.4) software.

The result in FIG. 8 shows that both the tooth dust and the supernatant comprise the self-assembling peptide P11-4, i.e., the experiment proves a transfer of peptide to the tooth.

Example 7: Penetration of Monomeric Self-Assembling Peptide into Subsurface Lesions a) Creation of Artificial Carious Lesions Creation of artificial lesions on extracted human molar teeth was performed as described by Lo et al. 2010 (J Dent. 38(4):352-359). To define the position of the demineralized subsurface area (i.e., artificial carious lesion or white spot), the tooth was covered with colourless nail varnish, leaving a window of approximately 4×4 mm. The tooth was placed in demineralization buffer (2.2 mM CaCl2, 2.2 mM NaH2PO4, 50 mM acetic acid; pH adjusted with 1 M KOH to 4.4) for 3 d at 37° C. To ensure that all pores are open, as in a typical active caries lesion, the resulting subsurface lesions were treated with 10 µL of 2% NaClO (incubation for 1 min), rinsed, and air-dried at room temperature.

Placebo-treated samples underwent identical pre-treatment.

Typical artificial lesions are shown in FIG. 9A.

b) Treatment

A 200 ppm (i.e., 200 µg/ml) solution of P11-4 (SEQ ID NO: 2), spiked with 10 ppm ATTO647-P11-4 (fluorescence labelled P11-4 (SEQ ID NO: 6): Ac-QQRFEW-EFEQQSGSGC-(ATTO647)-$NH_2$), i.e., 1:20, in 25 mM TRIS buffer was prepared at different pH, in particular, at 8.4 or 8.5 or 6.3, 6.5 or 6.8)

As specified in the table below, tooth were optionally pretreated, e.g., by incubation in human saliva for one day (about 24 hours), optionally followed by 5 min sonication (258 hz with a sonic toothbrush, Sonicare Diamond Clean® (Philips)) or by immersion in 2% NaClO for 1 min.

Tooth were immersed in the P11-4 solution for a defined period of time, 1, 2 or 5 min, and then removed and washed in water for 10 min or in remineralization buffer (2 mM Ca(NO3), 1.2 mM KHPO4, and 60 mM Tris/HCl, pH adjusted to 7.4 with 1 M KOH) for 4 days and/or 6 days.

Confocal assessment after 1, 2 or 5 min incubation was carried out while the teeth were in P11-4 solution, and optionally, after washing in water or in remineralization buffer after 10 min or 4 or 6 days.

c) Confocal Microscopy

Samples were placed in a µ-slide I (ibidi, Martinsried) in dest. water and analyzed by a confocal laser microscope (Olympus IX81). The recorded stack of four 2-dimensional images each projected the lesion volume of 51.4 µm thickness, giving a total assessment depth of 205 µm (objective: UPLSAPO 20×/NA 0.75; helium-neon gas laser; excitation: 633 nm and emission: 668 nm). Images were analyzed by Olympus software (FluoView FV1000).

d) Conclusion

While the visual analysis does not allow for exact quantitative conclusions, tendencies detected in repeated experiments allow for comparisons between different conditions of incubation and pretreatment.

TABLE 1

Conditions of treatment and assessment of the presence of fluorescent P11-4 in exemplary lesions is shown (1 = no or low presence to 4 = high presence of fluorescent P11-4)

| tooth | pH | saliva | NaClO | sonification | 1 min | 2 min | 5 min | $H_2O$ | Remin. buffer | 4 d | 6 d | Average presence of P11-4 |
|---|---|---|---|---|---|---|---|---|---|---|---|---|
| 4 | 6.3 | | | | 1 | 1 | 2 | x | | | 1 | 1.3 |
| 12 | 6.5 | | | | 2 | 3.5 | 2 | | x | 1 | | 2.1 |
| 3 | 6.3 | x | | | 1 | 1 | 1 | x | | | 1 | 1.0 |
| 13 | 6.8 | x | | | 1 | 2 | 2 | | x | 1 | | 1.5 |
| 10 | 8.5 | | | | 1 | 4 | 4 | | x | 2 | | 2.8 |

TABLE 1-continued

Conditions of treatment and assessment of the presence of fluorescent P11-4 in exemplary lesions is shown (1 = no or low presence to 4 = high presence of fluorescent P11-4)

| tooth | pH | saliva | NaClO | sonification | 1 min | 2 min | 5 min | H$_2$O | Remin. buffer | 4 d | 6 d | Average presence of P11-4 |
|---|---|---|---|---|---|---|---|---|---|---|---|---|
| 1 | 8.4 | | | | 4 | 2 | 2 | | | | | 2.7 |
| 2 | 8.4 | | | | 1 | 3 | 3 | x | | | 1 | 2.0 |
| ZR1 | 8.5 | | | x | 4 | 4 | 4 | | | | | 4.0 |
| 11 | 8.5 | x | | | 1 | 1 | 1 | | x | 1 | | 1.0 |
| 5 | 8.5 | x | | | 2 | 1 | 1 | | | | | 1.3 |
| ZR4 | 8.5 | x | | | 1 | 1 | 2 | | | | | 1.3 |
| ZR3 | 8.5 | x | | x | 1 | 3 | 3 | | | | | 2.3 |
| ZR2 | 8.5 | x | x | | 3 | 4 | 4 | | | | | 3.7 |

While, after incubation of the lesions with P11-4 at pH8.5 (teeth 10 and 1, tooth 10 in FIG. 9B), peptide was already detectable after 1 min incubation (FIG. 9Bb), most peptide was detected in the lesions after 2 min incubation (FIG. 9Bc) or 5 min incubation (FIG. 9Bd). Lower but significant amounts of peptide could reproducibly still be detected in the lesions after 4 days' incubation in remineralization buffer (FIG. 9Be).

A comparative experiment which differed only insofar as washing was carried out in water (tooth 2, pictures not shown) shows a tendency that remineralization buffer instead of water stabilizes presence of the self-assembling peptide in the lesion.

These experiments show that monomeric fluorescently labelled P11-4 at a concentration of 200 ppm in a slightly basic buffer can diffuse into the artificial carious lesions and form a stable network there. Previous art demonstrates that this leads to remineralization of lesions. No significant amounts of peptide are detected outside the lesions. It is believed that through assembly of the peptides in the lesion, the gradient is shifted, and further diffusion of peptide from the solution into the lesion is enabled, which leads to concentration of the self-assembling peptide in the lesion. Incubation in remineralization buffer, which mirrors human saliva, after contact with P11-4 containing solution improves maintenance of the self-assembling peptide in the lesion, probably by formation of complexes and remineralization.

The conclusion can be drawn that non-labelled P11-4 behaves the same way as the labelled detected peptide, and it can thus, at this or similar low concentrations be used for non-targeted treatment of early caries lesions such as sub-surface caries lesions per the invention.

Sonification as a pretreatment before incubation with P11-4 led to an increased presence of peptide in the lesions (tooth ZR1, pictures not shown).

After pre-incubation of a tooth with artificial lesions with human saliva, which is known to lead to formation of a pellicle on the tooth (teeth 11, 5 and ZR4, tooth 10 shown in FIG. 9C), there was a trend that incubation with fluorescence-marked peptide P11-4 at pH 8.5 for 1, 2, or 5 min led to significantly lower presence of the fluorescent peptide on the tooth or in the lesions than without such pre-incubation (FIG. 9B).

It could be shown that this negative effect of pellicle could be compensated for by cleaning the tooth by either sonication (tooth ZR3, shown in FIG. 9D) or treatment with NaClO (tooth ZR2, shown in FIG. 9E) after incubation with human saliva.

After formation of pellicle and cleaning by sonification, the self-assembling peptide could thus surprisingly be detected in even higher amounts than without pre-incubation with saliva.

After incubation at pH 6.3-6.8 (teeth 4, 12 (both without saliva), 3, 13 (both with saliva), teeth 12 and 13 shown in FIGS. 9F and 9G, respectively), i.e., when the peptide was in polymerized form, lower amounts of peptide were generally detectable in the lesions than after incubation at pH 8.4 or 8.5. Pellicle formation by incubation with saliva (Teeth 3, 13) further decreased infiltration by peptide.

The invention claimed is:

1. A method for treating a tooth of a subject, comprising applying a dental care product to a plurality of teeth of a subject, wherein the dental care product comprises
   (i) self-assembling peptides comprising the sequence of SEQ ID NO: 4 and having at least 80% sequence identity to one of the sequences of SEQ ID NO: 1 or 2, wherein the self-assembling peptides are present in the dental care product in monomeric form, and
   (ii) a pharmaceutically acceptable base,
      wherein the pH of the dental care product is not buffered but instead wherein the dental care product is solid with a water content low enough to prevent self-assembly of the self-assembling peptides,
      wherein the dental care product is applied to a plurality of teeth of the subject independent of diagnosis of caries,
      wherein the subject has an early subsurface caries lesion,
      wherein the concentration of self-assembling peptides is 0.1-1000 mg/kg,
      and wherein, after application, self-assembling peptides are present in monomeric state for at least 1 minute.

2. The method of claim 1, wherein the method remineralizes a tooth surface.

3. The method of claim 1, wherein at least 70% of the self-assembling peptide are present in a monomeric state in the dental care product before application.

4. The method of claim 1, wherein the pH of the dental care product is 7.5-9.0.

5. The method of claim 1, wherein the pH of the dental care product is more than 0.5 pH units above the pH at which the peptides start to undergo self-assembly.

6. The method of claim 1, wherein the concentration of self-assembling peptides is 0.1-99 mg/kg.

7. The method of claim 1, wherein said self-assembling peptides comprise a sequence having 100% sequence identity to one of the sequences of SEQ ID NOs: 1 or 2.

8. The method of claim 1, wherein the self-assembling peptide is encapsulated.

9. The method of claim 1, wherein the product is applied for at least 5 minutes.

10. The method of claim 1, wherein the product is for application at least once a week.

11. The method of claim 1, wherein, preferably, at least 50% of the self-assembling peptides are present in a monomeric state for at least 1 minute after application in the oral cavity.

12. The method of claim 1, wherein said peptide comprises the sequence of SEQ ID NO: 1.

13. The method of claim 1, wherein the dental care product is a toffee.

14. The method of claim 1, wherein the dental care product is a chewing gum.

15. The method of claim 1, wherein the dental care product is water-free.

16. The method of claim 1, wherein the dental care product is selected from the group comprising candy, lozenge, gelatin-gum, toffee, chewing gum, chew toy, or biscuit.

\* \* \* \* \*

SEQUENCE LISTING

```
<160> NUMBER OF SEQ ID NOS: 6

<210> SEQ ID NO 1
<211> LENGTH: 11
<212> TYPE: PRT
<213> ORGANISM: Artificial Sequence
<220> FEATURE:
<223> OTHER INFORMATION: designed self-assembling peptide P11-4

<400> SEQUENCE: 1

Gln Gln Arg Phe Glu Trp Glu Phe Glu Gln Gln
1               5                   10

<210> SEQ ID NO 2
<211> LENGTH: 11
<212> TYPE: PRT
<213> ORGANISM: Artificial Sequence
<220> FEATURE:
<221> NAME/KEY: MOD_RES
```

```
<222> LOCATION: 1..1
<223> OTHER INFORMATION: ACETYLATION
<220> FEATURE:
<223> OTHER INFORMATION: designed self-assembling peptide P11-4mod
<220> FEATURE:
<221> NAME/KEY: MOD_RES
<222> LOCATION: 11..11
<223> OTHER INFORMATION: AMIDATION

<400> SEQUENCE: 2

Gln Gln Arg Phe Glu Trp Glu Phe Glu Gln Gln
1               5                   10

<210> SEQ ID NO 3
<211> LENGTH: 5
<212> TYPE: PRT
<213> ORGANISM: Artificial Sequence
<220> FEATURE:
<223> OTHER INFORMATION: designed self-assembling peptide
<220> FEATURE:
<221> NAME/KEY: VARIANT
<222> LOCATION: 1..1
<223> OTHER INFORMATION: amino acid with acidic side chain
<220> FEATURE:
<221> NAME/KEY: VARIANT
<222> LOCATION: 2..2
<223> OTHER INFORMATION: amino acid with hydrophobic side chain that is
      selected from the group consisting of alanine, valine, isoleucine,
      leucine, methionine, phenylalanine, tyrosine and tryptophan
<220> FEATURE:
<221> NAME/KEY: VARIANT
<222> LOCATION: 3..3
<223> OTHER INFORMATION: amino acid with acidic side chain
<220> FEATURE:
<221> NAME/KEY: VARIANT
<222> LOCATION: 4..4
<223> OTHER INFORMATION: amino acid with hydrophobic side chain that is
      selected from the group consisting of alanine, valine, isoleucine,
      leucine, methionine, phenylalanine, tyrosine and tryptophan
<220> FEATURE:
<221> NAME/KEY: VARIANT
<222> LOCATION: 5..5
<223> OTHER INFORMATION: amino acid with acidic side chain

<400> SEQUENCE: 3

Xaa Xaa Xaa Xaa Xaa
1               5

<210> SEQ ID NO 4
<211> LENGTH: 5
<212> TYPE: PRT
<213> ORGANISM: Artificial Sequence
<220> FEATURE:
<223> OTHER INFORMATION: designed self-assembling peptide
<220> FEATURE:
<221> NAME/KEY: VARIANT
<222> LOCATION: 2..2
<223> OTHER INFORMATION: amino acid with hydrophobic side chain that is
      selected from the group consisting of alanine, valine, isoleucine,
      leucine, methionine, phenylalanine, tyrosine and tryptophan
<220> FEATURE:
<221> NAME/KEY: VARIANT
<222> LOCATION: 4..4
<223> OTHER INFORMATION: amino acid with hydrophobic side chain that is
      selected from the group consisting of alanine, valine, isoleucine,
      leucine, methionine, phenylalanine, tyrosine and tryptophan

<400> SEQUENCE: 4

Glu Xaa Glu Xaa Glu
1               5

<210> SEQ ID NO 5
<211> LENGTH: 5
```

```
<212> TYPE: PRT
<213> ORGANISM: Artificial Sequence
<220> FEATURE:
<223> OTHER INFORMATION: designed self-assembling peptide
<220> FEATURE:
<221> NAME/KEY: VARIANT
<222> LOCATION: 2..2
<223> OTHER INFORMATION: amino acid with hydrophobic side chain that is
      selected from the group consisting of alanine, valine, isoleucine,
      leucine, methionine, phenylalanine, tyrosine and tryptophan
<220> FEATURE:
<221> NAME/KEY: VARIANT
<222> LOCATION: 4..4
<223> OTHER INFORMATION: amino acid with hydrophobic side chain that is
      selected from the group consisting of alanine, valine, isoleucine,
      leucine, methionine, phenylalanine, tyrosine and tryptophan

<400> SEQUENCE: 5

Asp Xaa Asp Xaa Asp
1               5

<210> SEQ ID NO 6
<211> LENGTH: 16
<212> TYPE: PRT
<213> ORGANISM: Artificial Sequence
<220> FEATURE:
<221> NAME/KEY: MOD_RES
<222> LOCATION: 1
<223> OTHER INFORMATION: ACETYLATION
<220> FEATURE:
<223> OTHER INFORMATION: fluorescence labelled P11-4
<220> FEATURE:
<221> NAME/KEY: MOD_RES
<222> LOCATION: 16
<223> OTHER INFORMATION: AMIDATION
<220> FEATURE:
<221> NAME/KEY: MOD_RES
<222> LOCATION: 16
<223> OTHER INFORMATION: ATTO647

<400> SEQUENCE: 6

Gln Gln Arg Phe Glu Trp Glu Phe Glu Gln Gln Ser Gly Ser Gly Cys
1               5                   10                  15
```